US007231452B2

(12) United States Patent
Ananda et al.

(10) Patent No.: US 7,231,452 B2
(45) Date of Patent: Jun. 12, 2007

(54) METHOD AND APPARATUS FOR COMMUNICATING ON A COMMUNICATION NETWORK

(75) Inventors: Akkihebbal Lakshminarayana Ananda, Singapore (SG); Kai Wang, Singapore (SG); Ann Kian Yeo, Singapore (SG)

(73) Assignee: National University of Singapore, Singapore (SG)

( * ) Notice: Subject to any disclaimer, the term of this patent is extended or adjusted under 35 U.S.C. 154(b) by 772 days.

(21) Appl. No.: 10/306,985

(22) Filed: Nov. 29, 2002

(65) Prior Publication Data

US 2004/0107287 A1  Jun. 3, 2004

(51) Int. Cl.
*G06F 15/16* (2006.01)

(52) U.S. Cl. ............... 709/230; 709/245; 709/246; 370/466; 370/392

(58) Field of Classification Search ............... 709/230, 709/223, 238, 245–246, 220
See application file for complete search history.

(56) References Cited

U.S. PATENT DOCUMENTS

| | | | | |
|---|---|---|---|---|
| 6,038,233 A * | 3/2000 | Hamamoto et al. | ......... | 370/401 |
| 6,708,219 B1 * | 3/2004 | Borella et al. | ......... | 709/245 |
| 6,862,274 B1 * | 3/2005 | Tsao et al. | ......... | 370/338 |
| 6,912,219 B2 * | 6/2005 | Tsuchiya et al. | ......... | 370/392 |
| 7,006,526 B1 * | 2/2006 | Biederman | ......... | 370/466 |
| 7,012,931 B2 * | 3/2006 | Higuchi et al. | ......... | 370/467 |
| 2001/0040895 A1 * | 11/2001 | Templin | ......... | 370/466 |
| 2003/0026257 A1 * | 2/2003 | Xu et al. | ......... | 370/392 |
| 2003/0185236 A1 * | 10/2003 | Asano et al. | ......... | 370/469 |
| 2004/0088385 A1 * | 5/2004 | Blanchet et al. | ......... | 709/220 |

FOREIGN PATENT DOCUMENTS

JP  2000-183874  *  6/2000

OTHER PUBLICATIONS

G. Tsirtsis and P. Srisuresh, *Network Address Translation—Protocol Translation (NAT-PT)*, The Internet Society, Network Working Group, Standards Track, RFC 2766, Feb. 2000, pp. 1-21.

R. Gilligan and D. Nordmark, *Transition Mechanisms for IPv6 Hosts and Routers*, The Internet Society, Network Working Group, Standards Track, RFC 2893, Aug. 2000, pp. 1-29.

* cited by examiner

*Primary Examiner*—Philip B. Tran
(74) *Attorney, Agent, or Firm*—Lawrence Y.D. Ho & Assoc's.

(57) ABSTRACT

In a communication network (200) having an IPv6 communication backbone (210), each multi-protocol subnet (215 and 220) comprises: a mixture of IPv4 (215B and 220B), IPv6 (215D and 220D), and dual-stack (215C and 220C) hosts; and a communication protocol interface (215E and 220E). A corresponding gateway subnet (225) for communication beyond the communication network (200), includes a gateway communication protocol interface (225C). The communication protocol interfaces (215E and 220E) transport IPv4 data packets across the IPv6 communication backbone (210) within IPv6 data packets, allowing IPv4 hosts operating in any of the subnets to communicate with each other. The gateway communication protocol interface (225C) operates with the communication protocol interfaces (215E and 220E) to extend communication between IPv4 hosts in any of the subnets, to communication with IPv4 (108) hosts on the Internet 107.

41 Claims, 13 Drawing Sheets

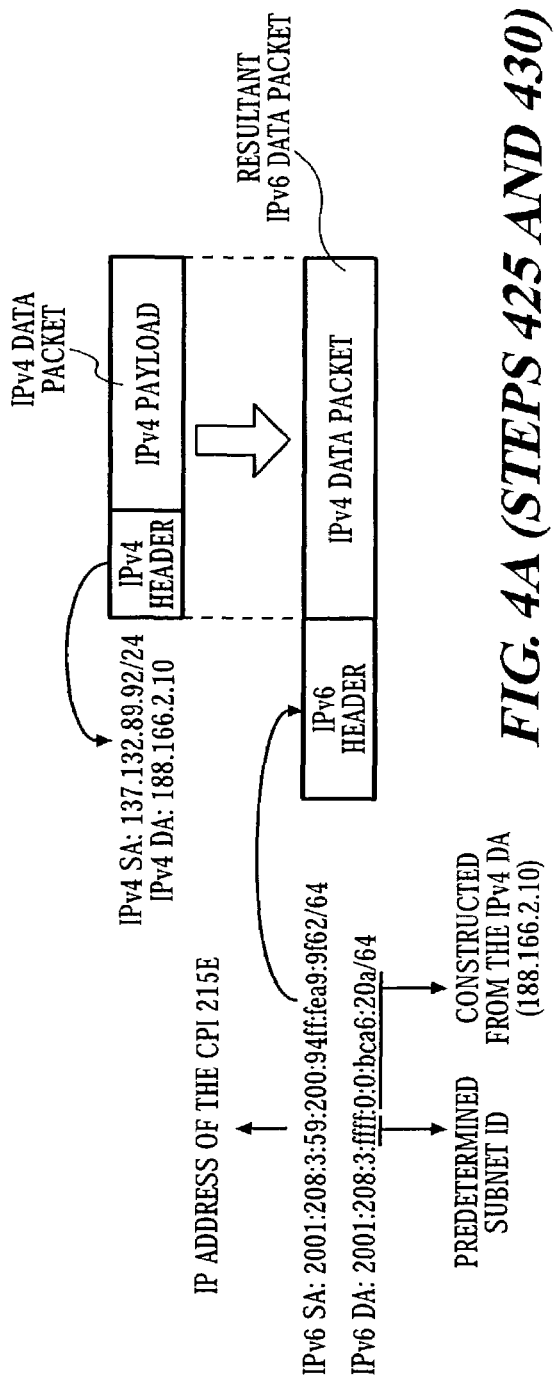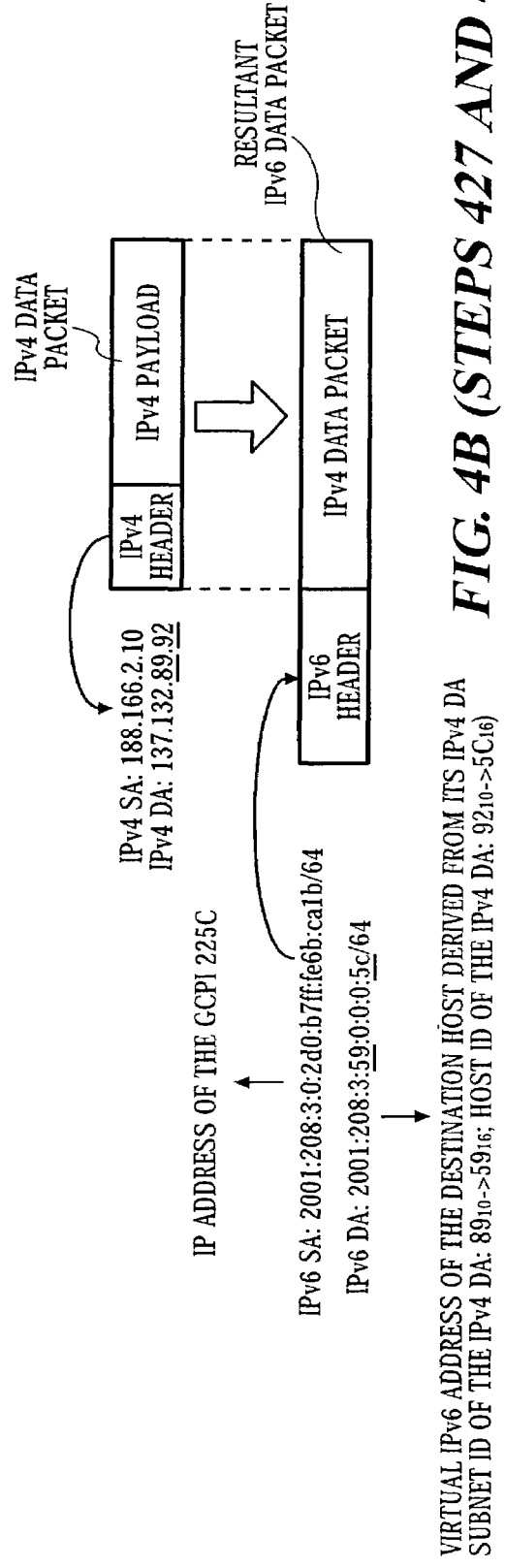

METHOD AND APPARATUS FOR COMMUNICATING ON A COMMUNICATION NETWORK

FIELD OF THE INVENTION

The present invention relates to communicating on a communication network and more particularly to communicating on a communication network using a variety of communication protocols.

BACKGROUND OF THE INVENTION

The Internet is a communication network that is accessible to individuals and organizations worldwide via a wide range of communication equipment. A fundamental basis for the operation of the Internet, or indeed any communication network, is a common set of communication protocols that specifically define how information is organized and communicated over the communication network.

The Internet comprises a series of connections between computers, which allow the connected computers to communicate. The content, scope, size, speed, and reliability of communication on the Internet are dependent on a set of communication protocols. Essentially, communication protocols are pre-established means of communication, and on the Internet the set of communication protocols is commonly referred to as a protocol stack. The Internet protocol stack is broken into functions of each of the set of communication protocols comprising a number of tasks, organized in layers, i.e. link, network, transport and application layers. Each layer corresponds to a different facet of communication. Internet Protocol (IP) is one of the sets of communication protocols of the Internet, which operates in the network layer.

IP is used for virtually all communication of information in data packets on the Internet. When sending data packets, IP determines how to get each of the data packets to their destination; and when receiving data packets IP determines where each of the data packets belong.

Clients, hosts and routers are primary network interfaces on the Internet, and each has a unique, numeric address called an IP address. IP determines, from a destination IP address of a data packet, how to get that data packet to its destination, and then sends it on its way. Deciding how to get the data packet to its destination is known as routing, and this is a critical task of IP.

There are two versions of IP that are of interest, the earlier IPv4, and the more recently developed IPv6. IPv4 is about twenty years old and is used extensively on the Internet. However, IPv4 suffers various limitations. A primary limitation of IPv4 is the shortage of address space, which is due to the 32-bit IP address length of IPv4. Almost all of the global Internet community uses IPv4, and therefore the 32-bit IPv4 addresses have to be shared globally. Not surprisingly, this has led to exhaustion of IPv4 addresses, and the need to expend resources within organizations, and some countries, to cope with the limited number of available IPv4 addresses. As is known, network address translators (NATs) are used to mediate the shortage of IPv4 addresses, however, NATs break end-to-end IP communication principle and NAT-unfriendly applications can not pass through the translator without involvement of application level gateways.

In order to overcome the IP address limitations, as well as other limitations of IPv4, the Internet Engineering Task Force (IETF) has standardized Internet Protocol version 6 (IPv6). IPv6 provides for an enlarged address space, where the length of the IP address has been extended to 128 bits. In addition, IPv6 supports: simplified IP headers to reduce the relay load on routers; IPsec security to provide encryption/decryption in the network layer that extends to the header as well as the payload of an IPv6 data packet; and structured addressing architecture for aggregation of routes, and the reduction of routing information The larger address space of IPv6 provides sufficient addresses, particularly for small organizations and developing countries that are suffering from exhaustion IPv4 addresses. In addition, IPv6 revives the end-to-end or peer-to-peer communication model on the Internet, which is necessary in order to support the growing number of e-commerce applications on the Internet.

Unfortunately, IPv6 and IPv4 communication protocols do not interoperate. Consequently, IPv4 applications do not work in an IPv6 environment and vice versa. However, the deployment of IPv6 within the present predominantly IPv4 Internet is expected to be incremental and start with small IPv6 communication networks that gradually merge into the global IPv6 portion of the Internet. It is envisaged that there will necessarily be a period of coexistence of IPv4 and IPv6 on the Internet. During the transition phase, due to a lack of IPv6 applications and services, any transition solution should incorporate support for existing IPv4 applications on IPv6 communication networks. There is therefore a need for transparent communication between IPv4 and IPv6 on communication networks, particularly among IPv4 nodes over IPv6 communication networks.

Known transition methods for supporting communication between IPv4 and IPv6 on a communication network have been provided by the IETF Next Generation Transition Working Group (Ngtrans). A Dual-Stack Transition Mechanism (DSTM) suggests a dual-stack method with dynamically assigned IPv4 addresses and the use of IPv4-over-IPv6 tunneling. However, a disadvantage of this method is that it only provides limited communication and lacks flexibility since IPv6 hosts have to obtain a tunnel endpoint address before setting up an IPv4-over-IPv6 tunnel.

One prior art method disclosed by R. Gilligan and D. Nordmark, titled "Transition Mechanisms for IPv6 Hosts and Routers", in RFC 2893, August 2000, includes a dual-stack mechanism, which mandates the complete support for IPv4 and IPv6 in hosts and routers. However, this approach does not reduce the demand for globally routable IPv4 addresses, and also increases the complexity of the communication network due to the need for both IPv4 and IPv6 routing infrastructure.

Another prior art method, which was also disclosed in RFC2893, teaches encapsulation of IPv6 data packets within headers of IPv4 data packets to carry the IPv6 data packets over existing IPv4 routing infrastructure. A disadvantage of this method is the need for extensive manual configuration. In addition, this approach is difficult to scale. Further, automatic tunneling can only be employed between individual hosts.

Yet another prior art method calls for proxy based mechanisms such as Application Level Gateway (ALG), SOCKS-based IPv6/IPv4 Gateway Mechanism (SOCKS64) and Transport Relay Translator (TCP-Relay), which provide communication between IPv4 nodes and IPv6 nodes on the Internet. These mechanisms split one IP connection into two closed connections on the application or the transport layer. One connection is for IPv4 and the other for IPv6. A disadvantage of this method is that ALG is an application-dependent mechanism. Therefore, for different applications ALG needs to provide different application gateway components. For example, SOCKS64, a networking proxy protocol, can only be provided for "socksified" sites consisting of SOCKS aware clients and a SOCKS server, hence the need for an application gateway component that supports SOCKS64.

A still further prior art method employs Network Address Translation—Protocol Translation (NATPT), is taught by Tsirtsis G., and Srisuresh P., in a publication titled "Network Address Translation-Protocol Translation (NAT-PT)", published in RFC 2766, February 2000. This solution is derived from the traditional NAT mechanism, plus protocol translation between IPv4 and IPv6 protocol. Another prior art method is Bump-In-the-Stack (BIS), which adds an address translator module into the node's system, which co-operates with an address mapper and an extension to a name resolver, to facilitate the transition. NAT-unfriendly applications cannot pass communication through the translator box without involving ALGs. Hence, a disadvantage of these methods is that, end-to-end communication is hampered.

Yet another prior art method is Stateless IP/ICMP Translation (SIIT), which provides a flexible and stateless translation between IPv4 and IPv6. However, a disadvantage of this method is that it is incomplete, since it does not specify how the data packets with IPv4-translated IPv6 address are to be routed in an IPv6 communication network.

Thus, the known transition methods do not provide an end-to-end solution, and are difficult to implement, as they require modifications to be made to existing components, such as at end or destination host(s). In addition, there are various operating systems and various versions of operating systems running on hosts on the Internet, which makes it very difficult to implement a feasible solution catering to all possible operating systems and versions thereof.

Hence, there is a need for a transition solution that provides transparent communication between IPv4 and IPv6, particularly among IPv4 hosts over IPv6 communication networks, which is also scalable to allow for gradual adoption of IPv6 in existing predominantly IPv4 communication networks.

BRIEF SUMMARY OF THE INVENTION

The present invention seeks to provide a method and apparatus for communicating on a communication network, which overcomes or at least reduces the abovementioned problems of the prior art.

Accordingly, in one aspect, the present invention provides a communication protocol interface (CPI) for communicating a variety of data packets that comply with a corresponding variety of communication protocols on a communication network, the CPI comprising:

a first communication protocol processor comprising:
a first input for receiving a data packet that complies with a first of the variety of communication protocols;
a second input for receiving a resultant data packet that complies with the first of the variety of communication protocols;
a first output for providing the data packet when the data packet is addressed to a subnet associated with the CPI, and the first output for providing the resultant data packet when the resultant data packet is addressed to the subnet associated with the CPI; and
a second output for providing the data packet when the data packet is addressed beyond the subnet associated with the CPI;

a second communication protocol processor comprising:
a first input for receiving another data packet that complies with a second of the variety of communication protocols;
a second input for receiving another resultant data packet that complies with the second of the variety of communication protocols;
a first output for providing the another data packet when the another data packet is addressed to the subnet associated with the CPI, and for providing the another resultant data packet; and
a second output for providing the another data packet when the another data packet is addressed to the subnet associated with the CPI; and a protocol converter comprising:
a first input coupled to the second output of the first communication protocol processor for receiving the data packet, and the protocol converter for converting the data packet to the another resultant data packet;
a first output coupled to the second input of the second communication protocol processor for providing the another resultant data packet to the second communication protocol processor;
a second input coupled to the second output of the second communication protocol processor for receiving the another data packet, and the protocol converter for converting the another data packet to the resultant data packet; and
a second output coupled to the second input of the first communication protocol processor for providing the resultant data packet to the first communication protocol processor.

In another aspect the present invention provides a method in a communication protocol interface (CPI) for communicating a variety of data packets that comply with a corresponding variety of communication protocols on a communication network, the method comprising:

a) receiving a data packet;
b) determining the communication protocol of the data packet is the first of the variety of communication protocols;
c) determining destination address of the data packet;
d) transmitting the data packet in accordance with the destination address thereof on the communication network when the destination address is associated with one of a plurality of predetermined destination addresses on the communication network; and
e) when the destination address is not associated with any of the plurality of predetermined destination addresses on the communication network, converting the data packet to a second of the variety of communication protocols to produce another resultant data packet, wherein the destination address of the another resultant data packet comprises a first part derived from an address of the CPI, a second part determined relative to the destination addresses on the communication network, and a third part derived from the destination address of the data packet.

In yet another aspect the present invention provides a communication network comprising:
an infrastructure portion for communicating data packets that comply with a first communication protocol thereon;
a first multi-protocol subnet coupled to the infrastructure portion comprising:
at least a first host operating on a second communication protocol, the at least the first host for transmitting a data packet that complies with the second communication protocol to a destination host on a second multi-protocol subnet; and a first communication protocol interface (CPI) coupled to the at least the first host, the first CPI for receiving the data packet, converting the data packet to another resultant data packet that complies with the first communication protocol, and for transmitting the resultant data packet via the infrastructure portion to the second multi-protocol subnet; and the second multi-protocol subnet comprising:

a second CPI for receiving the resultant data packet, for converting the resultant data packet back to the data packet that complies with the second communication protocol, and for transmitting the data packet to the destination host; and the destination host coupled to the second CPI operating on the second communication protocol for receiving and processing the data packet.

BRIEF DESCRIPTION OF THE DRAWINGS

An embodiment of the present invention will now be more fully described, by way of example, with reference to the drawings of which:

FIG. 4A shows one form of encapsulation by the encapsulator;

FIG. 4B shows another form of encapsulation by the encapsulator;

DETAIL DESCRIPTION OF THE DRAWINGS

A communication protocol interface (CPI) comprises an IPv4 processor for processing IPv4 specific communication, an IPv6 processor for processing IPv6 specific communication, and a protocol converter for processing communication between the IPv4 and IPv6 processors. In a communication network for an organization, where an organization wide IPv6 communication backbone is employed, subnets of the communication network on the IPv6 communication backbone, comprise multi-protocol subnets and gateway multi-protocol subnets. A multi-protocol subnet has a mixture of IPv4, IPv6, and dual-stack hosts i.e. IPv4 and IPv6 hosts; and a CPI. In addition, a corresponding gateway multi-protocol subnet for communication beyond the communication network, include a gateway communication protocol interface (GCPI), which is coupled to the communication network and also to the Internet. The CPIs in the multi-protocol subnets transport IPv4 data packets across the IPv6 communication backbone encapsulated in IPv6 data packets between the subnets. This allows IPv4 hosts operating in one of the multi-protocol subnets, to communicate with IPv4 hosts in other subnets of the communication network. In addition, the CPIs and GCPIs in the subnets also transport IPv4 data packets across the IPv6 backbone encapsulated in IPv6 data packets. This allows IPv4 hosts operating in any of the subnets, to communicate with IPv4 hosts on the Internet.

The present invention, as described below, advantageously supports transparent operation of both IPv4 and IPv6 in multi-protocol subnets of a communication network of an organization, between multi-protocol subnets of the organization, and between multi-protocol subnets and the Internet. This enables a gradual adoption and transition of an organization from IPv4 to IPv6 without the need for modifications to be made to end or destination host(s), and independent of the various operating systems, and various versions of operating systems, that may be running on hosts in subnets of the organization or on the Internet.

Figure 1:
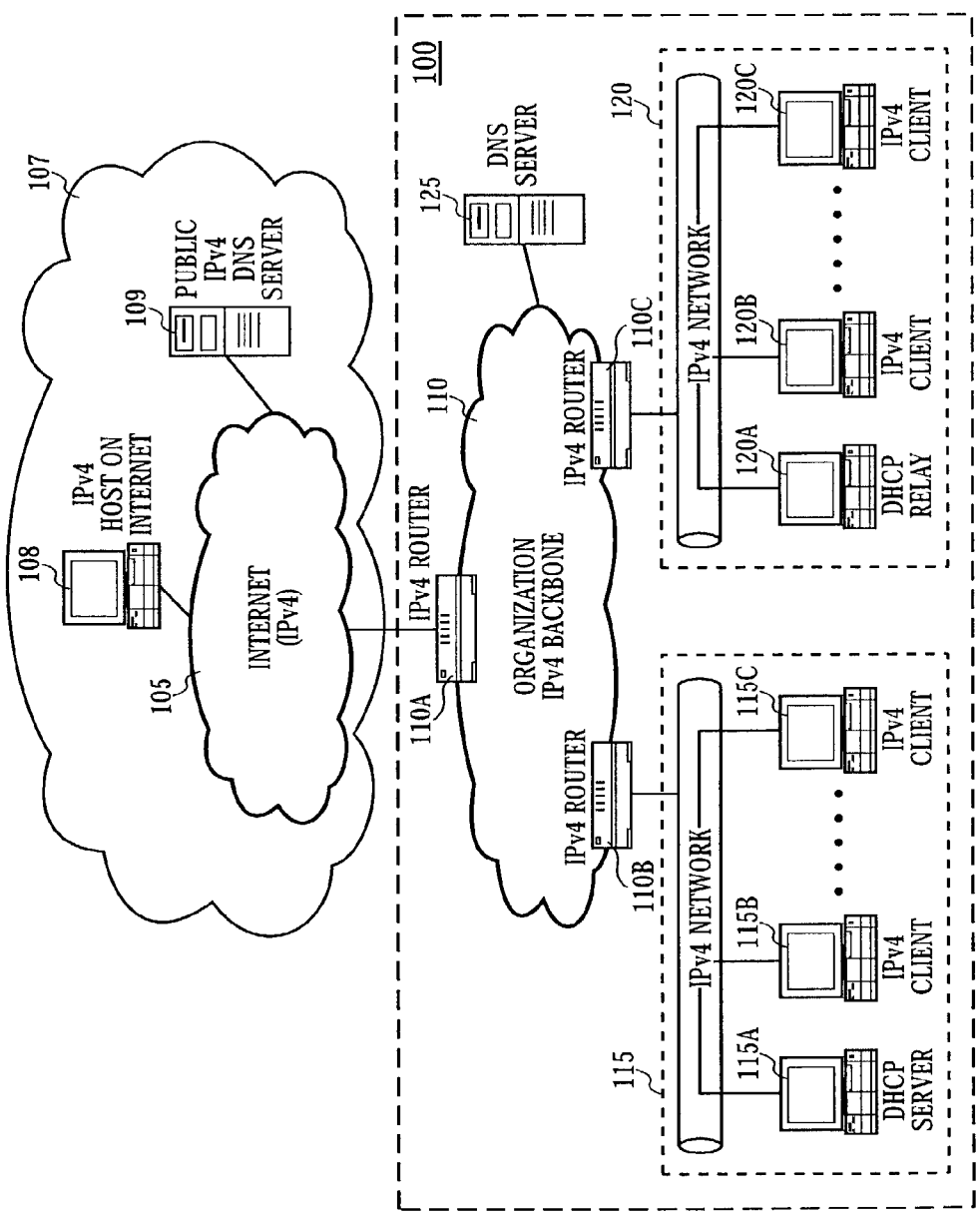
FIG. 1 shows a prior art communication network for an organization.

With reference to FIG. 1, a prior art communication network 100 is coupled to an IPv4 portion 105 of the Internet 107, which includes various network interfaces. Here, only one IPv4 host 108, and one public IPv4 domain name server (DNS) 109, are shown. The prior art communication network 100 typically comprises an infrastructure portion, which is commonly referred to as a communication backbone 110; a number of IPv4 subnets 115 and 120 (only two shown), which are independently coupled to the IPv4 communication backbone 110; and a DNS server 125, which is also coupled to the IPv4 communication backbone 110.

It should be noted that a subnet, as defined by The Free On-line Dictionary of Computing, © 1993-2001 Denis Howe, is a portion of a network, which may be a physically independent network segment, which shares a network address with other portions of the network and is distinguished by a subnet number.

The IPv4 communication backbone 110 comprises a number of inter-coupled IPv4 routers 110A, 110B and 110C, that route IPv4 data packets (not shown) primarily between the subnets 115 and 120, in accordance with respective routing tables that are stored and maintained by the respective routers 110A-110C. In addition, the communication network 100 is a private network, and the routers 110A-110C also route IPv4 data packets between the subnets 115 and 120 and the DNS 125. One of the routers 110A supports a communication link for routing IPv4 data packets between the IPv4 portion 105 of the Internet 107, for example with the IPv4 host 108 or the public DNS server 109, and the subnets 115 and 120. The routers 110A-110C that form the IPv4 communication backbone 110 only support IPv4.

The subnet 115 comprises a number of inter-coupled network interfaces, typically comprising a number of networked computers. One of the computers is configured to operate as a dynamic host configuration protocol (DHCP) server 115A, while the other computers are configured to function as IPv4 hosts 115B and 115C. Like the routers 110A-110C and the IPv4 portion 105 of the Internet 107, the DHCP server 115A and the hosts 115B and 115C only support IPv4.

The subnet 120 is similar to the subnet 115 and also comprises a number of networked computers. One of the computers is configured to function as a DHCP relay 120A, and the other computers are configured to operate as hosts 120B and 120C. As before, the computers 120A-120C only support IPv4.

The DNS server 125 comprises a computer that is configured to support domain name services within the communication network 100. The DNS server 125 only operates on IPv4.

The communication network 100 is typically employed in an organization, for example in a corporation or university. To transition from IPv4 to IPv6, the prior art approach has been for the organization to initiate change from the host level first to make all end components operable on IPv6, and then change the communication backbone to support IPv6. Consequently, existing hosts 115B, 115C, 120B, 120C, as well as the DHCP server 115, the DHCP relay 120A and the DNS server 125, will necessarily have to be changed from IPv4 to dual-stack hosts that operate on both IPv4 and IPv6, to enable existing IPv4 or new IPv6 applications on the hosts and servers, to run without modification. Unfortunately, existing hosts and servers that only operate on IPv4 will not function, since IPv4 and IPv6 are not interoperable.

Hence, this approach necessitates modifications to all existing end components, and the costs associated with conducting modifications on this scale is prohibitive. Such costs provide little motivation on the part of an organization to change from IPv4 to IPv6. In addition, for most organizations, the resources and services that they require on the Internet are widely available on IPv4 systems. Therefore, again based on the prior art methods, there isn't significant motivation for an organization to change from IPv4 to IPv6.

The present invention advantageously proposes an alternative approach to adoption of IPv6 by an organization. The initial step is to upgrade the IPv4 communication backbone 110 to IPv6 by changing all the IPv4 routers 110A-110C to IPv6 routers, and then converting the subnets 115 and 120 of the communication network 100 to multi-protocol IPv4-IPv6 subnets by incorporating a communication protocol interface. The communication protocol interfaces in the subnets advantageously enables existing IPv4, new IPv6, and any dual-stack hosts in each multi-protocol subnet to operably couple to other subnets, and to IPv4 hosts and IPv6 hosts on the Internet, via the IPv6 communication backbone.

With this approach, a transition program from IPv4 to IPv6 can be adopted by an organization, which starts with changing the communication backbone from IPv4 to IPv6, while maintaining operational compatibility with existing end components, without modifications to the end components. This can then be followed by gradually changing IPv4 end components to IPv6 end components, based on costs and the degree of IPv6 utility of the organization. Although there is an initial cost of changing the communication backbone and implementing CPIs in the subnets, this is a relatively less significant cost than effecting modifications to all the IPv4 end-components as taught by the methods of the prior art. In addition, the organization retains access to IPv4 services and resources on the Internet while transitioning from IPv4 to IPv6.

Figure 2:
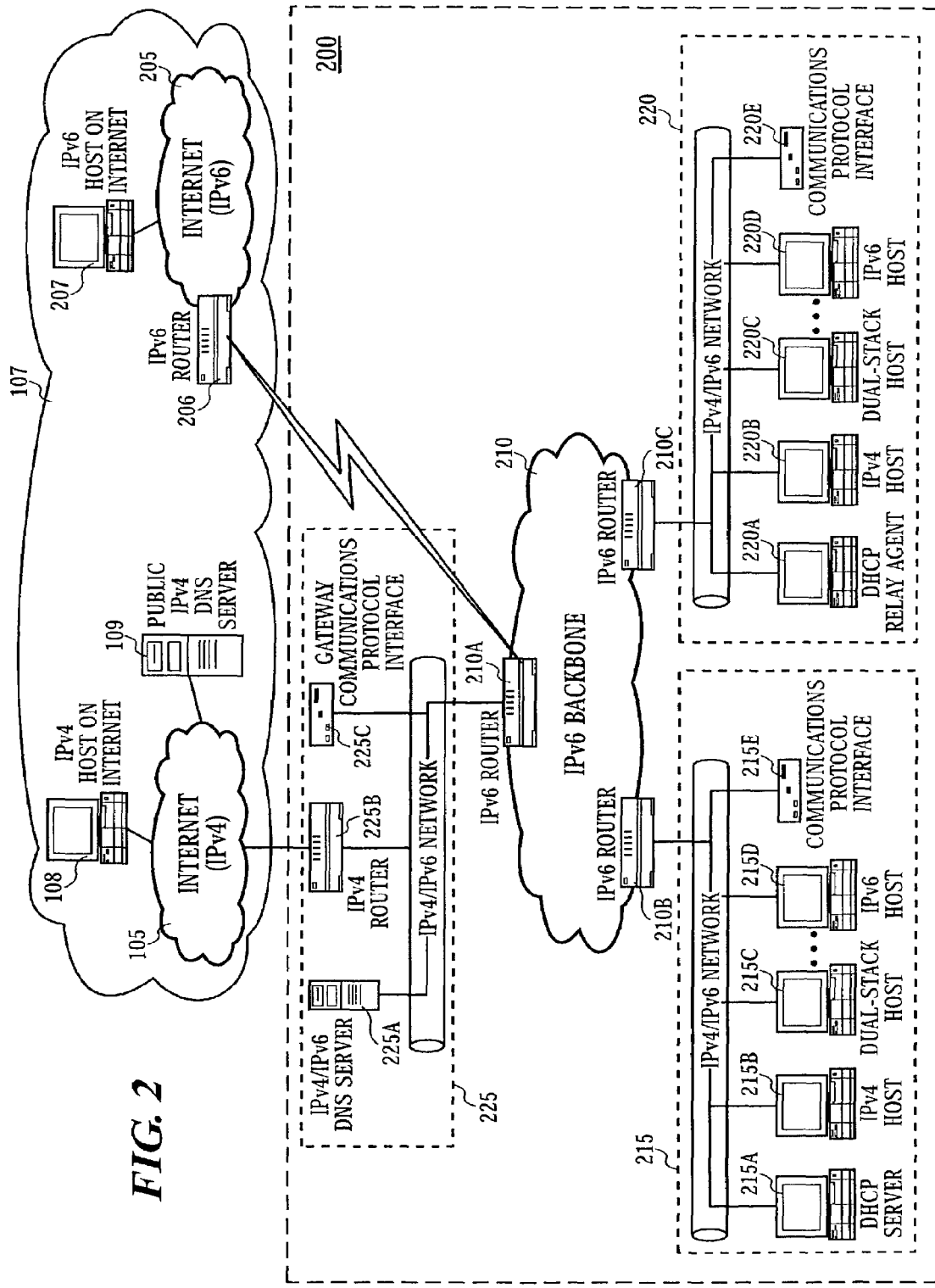
FIG. 2 shows a communication network in accordance with the present invention.

With reference to FIG. 2 a communication network 200, in accordance with the present invention, is coupled to the IPv4 portion 105 of the Internet 107, and to an IPv6 portion 205 of the Internet 107, which includes various network interfaces. As before, only one IPv4 host 108, and one public IPv4 domain name server (DNS) 109 are shown. In addition, only one IPv6 host 207 is shown on the IPv6 portion 205 of the Internet 107.

The communication network 200 comprises: an IPv6 communication backbone 210; a number of multi-protocol subnets 215 and 220 (only two shown) that are independently coupled to the IPv6 communication backbone 210; and a gateway multi-protocol subnet 225, which is coupled to the IPv6 communication backbone 210 and to the IPv4 portion 105 the Internet 107. In addition, the IPv6 communication backbone 210 is also coupled directly to the IPv6 portion 205 of the Internet 107 via an IPv6 router 206.

The IPv6 communication backbone 210 comprises a number of routers 210A, 210B, and 210C, which only route IPv6 data packets (not shown). The IPv6 data packets are routed between the multi-protocol subnets 215 and 220, and between the multi-protocol subnets 215 and 220 and the gateway multi-protocol subnet 225, in accordance with respective routing tables that are stored and maintained by the respective routers 210A-210C. All the routers 210A, 210B, and 210C support IPv6 only, and can therefore be connected directly to the IPv6 portion 205 of the Internet 107 via IPv6 router 206.

The multi-protocol subnet 215 is coupled to the router 210B and comprises a number of inter-coupled network interfaces, typically comprising a number of networked computers that are configured to function as a dual-stack DHCP server 215A, an IPv4 host 215B, a dual-stack host 215C, and an IPv6 host 215D. In addition, the multi-protocol subnet 215, advantageously includes a CPI 215E that enables multi-protocol communication within the multi-protocol subnet 215; and also enables communication between subnets, that are similarly equipped with a CPI, including other multi-protocol subnets, such as the multi-protocol subnet 220.

The multi-protocol subnet 220 is coupled to the router 210C, is similar to the multi-protocol subnet 215, and comprises a number of networked computers, which function as a dual-stack DHCP relay 220A, an IPv4 host 220B, a dual-stack host 220C, and an IPv6 host 220D. In addition, the multi-protocol subnet 220 includes another CPI 220E that enables multi-protocol communication within the multi-protocol subnet 220; and also enables communication between subnets coupled to the IPv6 communication backbone 210.

The gateway multi-protocol subnet 225 is coupled to the router 210A, and comprises a dual-stack DNS server 225A, an IPv4 router 225B, and advantageously includes a GCPI 225C. The DNS server 225A provides domain name service to the hosts on the communication network 200, including the hosts 215A-215D and 220A-220D via the IPv6 communication network 210. The IPv4 router 225B only routes IPv4 data packets and is coupled to the IPv4 portion 105 of the Internet 107 to provide the IPV4 hosts 215B and 220B and dual-stack hosts 215C and 220C, on the communication network 200, with access to IPv4 hosts 108 on the IPv4 portion 105 of the Internet 107, or the public IPv4 DNS server 109.

The GCPI 225C advantageously enables multi-protocol communication within the gateway multi-protocol subnet 225; and also enables communication between all subnets coupled to the IPv6 communication backbone 210, including the multi-protocol subnets 215 and 220, and the IPv4 portion 105 of the Internet 107.

Other subnets (not shown) may be coupled to the IPv6 communication backbone 210. For example, a subnet can comprise purely IPv4 hosts. Such subnets will need to include a CPI to operate as multi-protocol subnets, such as multi-protocol subnets 215 or 220 described above. The inclusion of the CPIs 215E and 220E enables the purely IPv4 hosts 215B and 220B or the dual-stack hosts 215C and 220C to communicate with IPv4 and dual-stack hosts across the subnets on the IPv6 communication backbone 210; and, via the GCPI 225C and the gateway multi-protocol subnet 225, enables communication across the IPv4 portion 105 of the Internet 107.

global unicast IPv6 addresses or site local addresses, provided the assigned IPv6 addresses do not overlap.

IPv6 supports auto-configuration, where the last 64-bit interface ID is obtained from, for example a EUI-64 based interface identifier, of the network device. For virtual IPv6 address assignment, the virtual IPv6 address can be derived from the host ID of the end host's IPv4 address. Virtual IPv6 addresses are specially for typifying an IPv4 host or dual-stack host. TABLE 1 below provides an illustration of the address assignment scheme.

TABLE 1

|  | IPv4 Address | IPv6 Address | Virtual IPv6 Address |
| --- | --- | --- | --- |
| IPv4 host | 137.132.80.109/24 | NA | 2001:208:3:50::6D/64 |
| IPv6 host | NA | 2001:208:3:50:260:8ff:fe39:504f/64 | NA |
| Dual-stack host | 137.132.80.110/24 | 2001:208:3:50.2e0:ff:fe5a:714c/64 | 2001:208:3:50::6E/64 |

For the multi-protocol subnets 215 and 220, an addressing assignment scheme is required. For example in the multi-protocol subnet 215, the IPv4 host 215B is assigned an IPv4 address, and also a virtual IPv6 address; the dual-stack host 215C is assigned an IPv4 address, a virtual IPv6 address, and an IPv6 address; and the IPv6 host 216D is assigned an IPv6 address. The virtual IPv6 addresses of the IPv4 host 215B and the dual-stack host 215C are not actually configured on the physical interfaces of the IPv4 host 215B and the dual-stack host 215C, but are configured on the CPI 215E to take on an IPv6 neighbor proxy function.

IPv4 hosts and dual-stack hosts can be assigned global IPv4 addresses or private IPv4 addresses. Where an organization has an existing network with a sufficient number of global IPv4 addresses, the existing IPv4 addressing scheme can be retained. However, private IPv4 addresses can also be assigned to the IPv4 hosts and dual-stack hosts. The IPv4 address assignment can be static or dynamic, when the DHCP service is employed.

In relation to IPv6 address assignments, each network interface of an IPv6 host or a dual-stack host can have multiple IPv6 addresses; for example, link local address, site local address, and aggregatable global unicast address. In addition, an IPv6 network of an organization can have global unicast IPv6 addresses if the organization has been assigned a registered global unicast IPv6 prefix. Alternatively, the IPv6 network can adapt IPv6 site local addresses.

Whether local or global unicast IPv6 addresses are used, in a preferred embodiment, the first 48 bits of the 128-bit IPv6 address are not taken into consideration. The next 16 bits, which represents a subnet ID for a site local IPv6 address or a SLA ID in a global unicast address, is employed for assigning a subnet ID; and the subsequent 64 bits are used as specific interface IDs.

Figure 3:
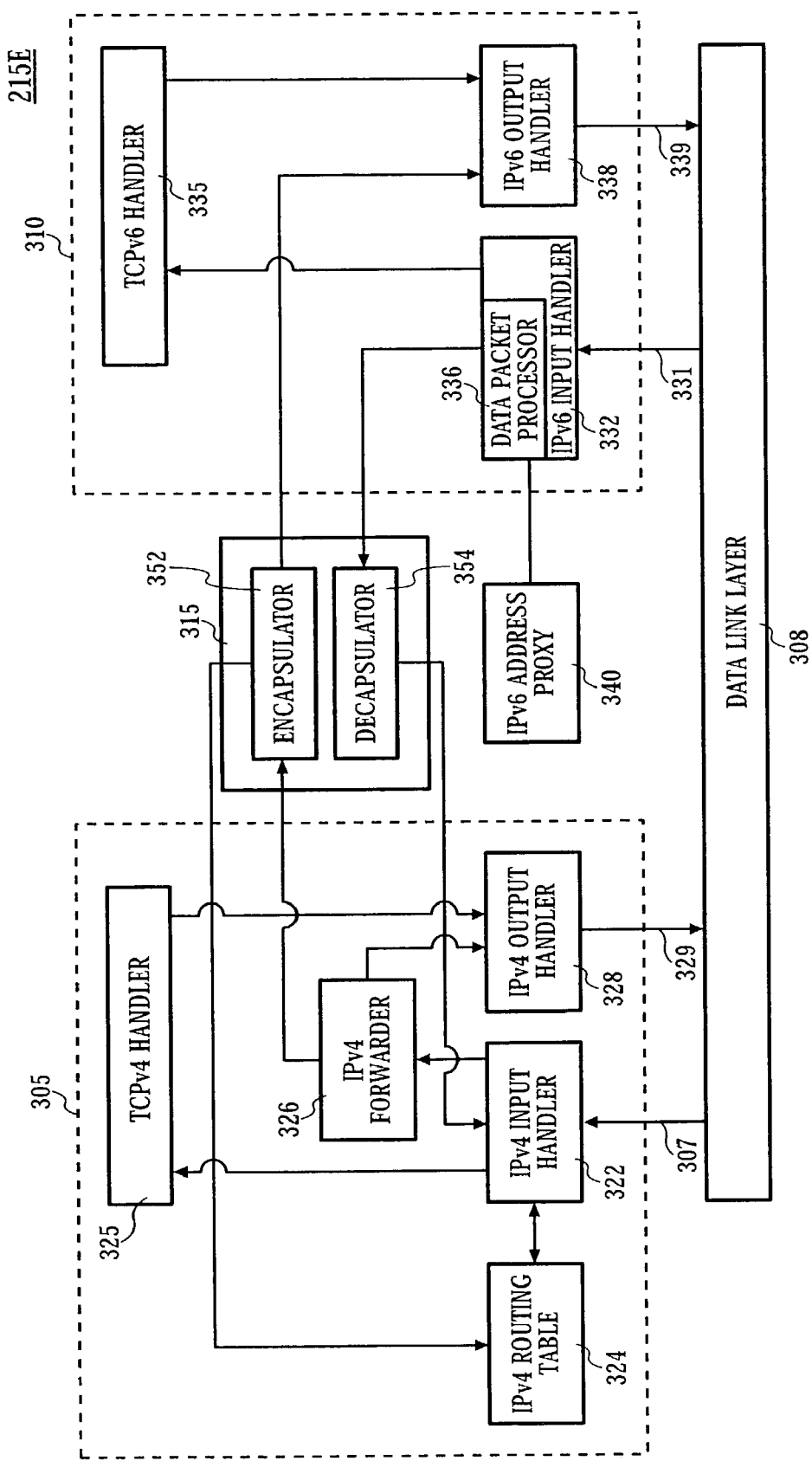
FIG. 3 shows a functional block diagram of a communication protocol interface in the communication system in FIG. 2, in accordance with the present invention.

The virtual IPv6 address takes advantage of the large IPv6 address space i.e. the last 64-bit interface ID part of an IPv6 address provides a much larger address space than the entire 32-bit IPv4 address space. Therefore, in the preferred embodiment, each IPv4 host or dual-stack host can be assigned a virtual IPv6 address, where assigning means that an assigned virtual IPv6 addresses is used to specifically identify an IPv4 host or a dual-stack host. Assigned virtual IPv6 addresses and actually assigned IPv6 addresses can be With reference to FIG. 3 the CPI 215E in the multi-protocol subnet 215 comprises a first communication protocol processor, such as an IPv4 processor 305, for processing IPv4 communication; a second communication protocol processor, such as an IPv6 processor 310, for processing IPv6 communication; and a protocol converter 315 that is coupled to both the IPv4 and IPv6 processors 305 and 310, for converting IPv4 communication received from the IPv4 processor 305 to resultant IPv6 communication, and then providing the resultant IPv6 communication to the IPv6 processor 310. In addition, the protocol converter 315 converts IPv6 communication received from the IPv6 processor 310 to resultant IPv4 communication and then provides the resultant IPv4 communication to the IPv4 processor 305.

The IPv4 processor 305 comprises an IPv4 input handler 322, which is coupled to input 307 for receiving an IPv4 data packet from a data link layer 308 of the multi-protocol subnet 215. The IPv4 input handler 322 is also coupled to an IPv4 routing table 324, a TCPv4 handler 325, and an IPv4 forwarder 326. Upon receiving an IPv4 data packet from the data link layer 308, the IPv4 input handler 322 determines the IPv4 destination address from the received IPv4 data packet, and accesses the IPv4 routing table 324 to determine where the IPv4 data packet should be routed. When the IPv4 input handler 322 determines that the destination address of the received IPv4 data packet is the address of the CPI 215E, the IPv4 input handler 322 routes the received IPv4 data packet to the TCPv4 handler 325, which processes the IPv4 data packet, and provides resultant output data to a higher layer (not shown) of the IPv4 stack for further processing. The TCPv4 handler 325 also processes input data from the higher layer of the IPv4 stack, and provides a resultant CPI-originated IPv4 data packet to the IPv4 output handler 328. The IPv4 output handler 328 then provides the resultant CPI-originated IPv4 data packet to the data link layer 308 via output 329.

When the IPv4 data packet is not addressed to the CPI 215E, and an entry in the IPv4 routing table 324 indicates that the destination address of the IPv4 data packet is the address of a host 215A, 215B or 215C on the subnet 215 or an address of an IPv4 host 108 on the IPv4 portion 105 of the Internet, then the IPv4 input handler 322 sends the IPv4 data packet to the IPv4 forwarder 326.

When the destination address of the IPv4 data packet is the address of a host 215A, 215B or 215C on the subnet 215, the IPv4 forwarder 326 sends the IPv4 data packet to an IPv4 output handler 328. The IPv4 output handler 328 then provides the IPv4 data packet to the data link layer 308 via the output 329 for transmission to the addressed host on the subnet 215. When the destination address of the IPv4 data packet is the address of an IPv4 host 108 on the IPv4 portion 105 of the Internet, then the IPv4 forwarder 326 sends the IPv4 data packet to the protocol converter 315.

The IPv4 processor 305 is also coupled to receive a resultant IPv4 data packet from the protocol converter 315, and the IPv4 input handler 322 has another input, which receives the resultant IPv4 data packet and processes the resultant IPv4 data packet as described earlier, when an IPv4 data packet was received from the input 307.

The IPv6 processor 310 comprises an IPv6 input handler 332, which is coupled to input 331 for receiving IPv6 data packets from the data link layer 308. The IPv6 input handler 332 is also coupled to the protocol converter 315, and a TCPv6 handler 335. Upon receiving an IPv6 data packet from the data link layer 308, the IPv6 input handler 332 determines the destination address of the IPv6 data packet, to determine how the IPv6 data packet is to be processed.

When the destination address of the IPv6 data packet is the address of the CPI 215E i.e. the IPv6 data packet is addressed to it, the IPv6 input handler 332 then checks the IPv6 data packet's next header. If the IPv6 data packet does not contain an IPv4 data packet, the IPv6 input handler 332 routes the IPv6 data packet to the TCPv6 handler 335, which processes the IPv6 data packet, and provides resultant output data to a higher layer (not shown) of the IPv6 stack for further processing. The TCPv6 handler 335 also processes input data from the higher layer of the IPv6 stack, and provides a resultant CPI-originated IPv6 data packet to the IPv6 output handler 338. The IPv6 output handler 338 then provides the resultant CPI-originated IPv6 data packet to the data link layer 308 via output 339.

When the IPv6 input handler 332 determines that the destination address of the IPv6 data packet is not the address of the CPI 215E, a data packet processor 336, which is a part of the IPv6 input handler 332, determines whether the received IPv6 data packet is a resultant IPv6 data packet that encapsulates an IPv4 data packet. This is accomplished by accessing an IPv6 address proxy 340 to determine whether the destination address of the IPv6 data packet is a virtual IPv6 address of an IPv4 host 215B or a dual-stack host 215C on the multi-protocol subnet 215. When it is not, the IPv6 data packet is discarded. Alternatively, when it is, the data packet processor 336 provides the IPv6 data packet to the protocol converter 315.

The IPv6 address proxy 340, which is also referred to as a neighbor proxy, stores the virtual IPv6 addresses of the IPv4 host 215B and the dual-stack host 215C, which are part of the multi-protocol subnet 215. When the IPv6 address proxy 340 receives an IPv6 data packet with one of the stored virtual IPv6 address from the IPv6 input handler 332, the IPv6 input handler 332 provides the received data packet to the protocol converter 315.

The IPv6 output handler 338 is also coupled to receive a resultant IPv6 data packet, which comprises an encapsulated IPv4 data packet, and provides the resultant IPv6 data packet to the data link layer 308 via the output 339.

The protocol converter 315 comprises an encapsulator 352 and a decapsulator 354. The encapsulator 352 has an input that is coupled to the IPv4 forwarder 326 to receive an IPv4 data packet, and it has an output that is coupled to the IPv6 output handler 338 to provide a resultant IPv6 data packet, which comprises the IPv4 data packet encapsulated therein. The encapsulator 352 is coupled to the IPv4 routing table 324, and upon initialization creates two routing entries in the IPv4 routing table 324. One of the routing entries is to enable transmission of IPv4 data packets between the multi-protocol subnets 215 and 220, and the other routing entry is to enable transmission from the multi-protocol subnet 215 or 220 to the gateway multi-protocol subnet 225.

When the destination address of the IPv4 data packet received by the encapsulator 352 is not in the IPv4 routing table 324, the IPv4 data packet is to be transmitted using the routing entry for transmission from the multi-protocol subnet 215 or 220 to the gateway multi-protocol subnet 225 to the IPv4 portion 105 of the Internet 107. The encapsulator 352 then encapsulates the received IPv4 data packet in the resultant IPv6 data packet, where the IPv6 destination address of the resultant IPv6 data packet includes a predetermined subnet ID (ffff). This predetermined subnet ID identifies the resultant IPv6 data packet as one that encapsulates an IPv4 data packet, and that the encapsulated IPv4 data packet is to be transmitted via the IPv4 portion 105 of the Internet 107.

Alternatively, when the destination address of the IPv4 data packet is in the IPv4 routing table 324, then the received IPv4 data packet is for transmission either between two multi-protocol subnets 215 and 220, or from the gateway multi-protocol subnet 225 to one of the multi-protocol subnets 215 or 220; and the destination address of the IPv4 data packet is that of an IPv4 destination host on one of the subnets 215 or 220 of the IPv6 communication backbone 210. The encapsulator 352 then encapsulates the IPv4 data packet in the resultant IPv6 data packet, where the IPv6 destination address of the resultant IPv6 data packet includes the subnet ID of the IPv4 destination host and host ID of the IPv4 destination host.

The decapsulator 354 has an input that is coupled to the IPv6 input handler 332 to receive an IPv6 data packet, and it has an output that is coupled to the IPv4 input handler 322. The decapsulator 354 decapsulates the IPv6 data packet and provides a resultant IPv4 data packet. The resultant IPv4 data packet is processed by the IPv4 input handler 322, as described earlier.

Figure 4:
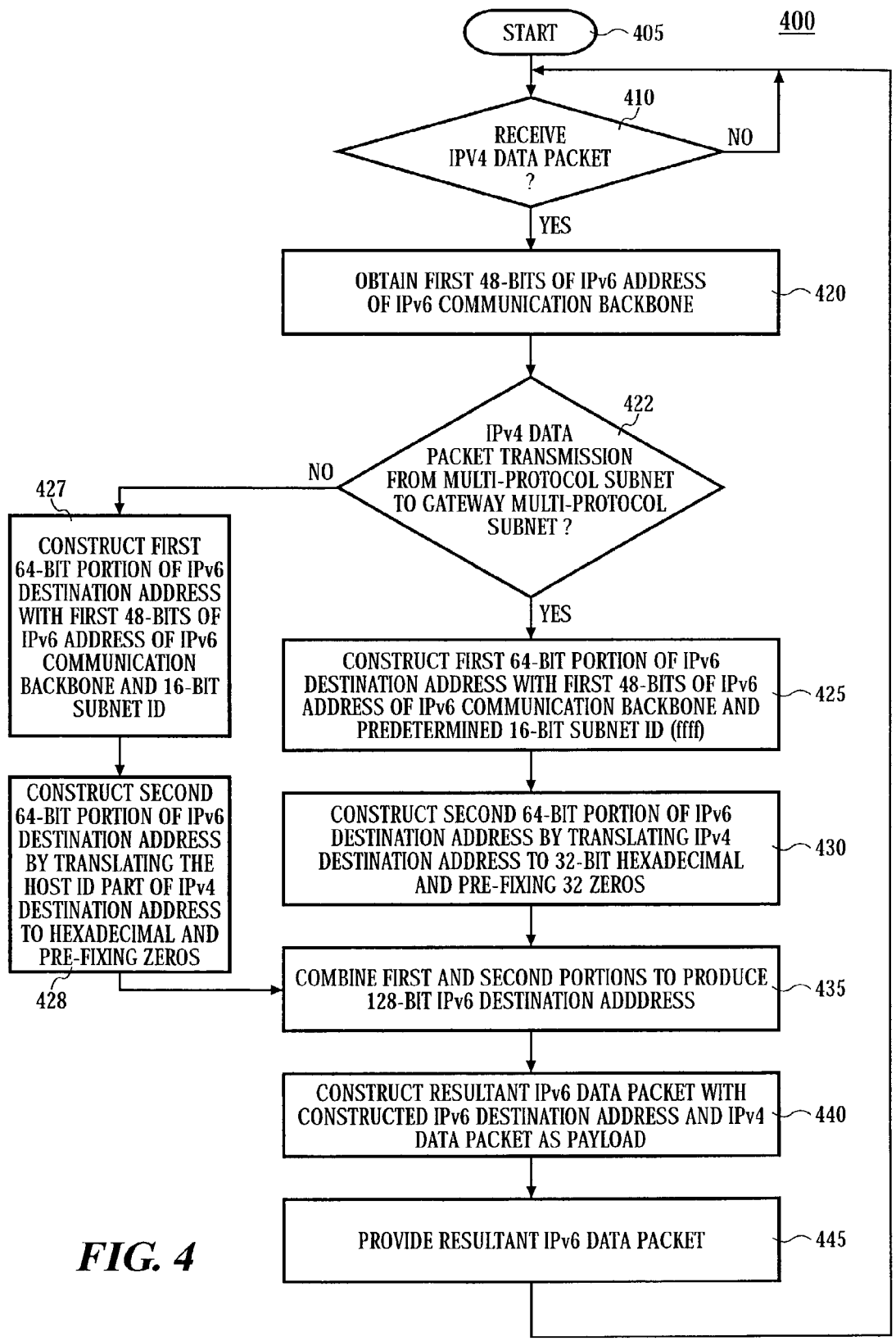
FIG. 4 shows a flowchart detailing the operation of the encapsulator in the communication protocol interface in FIG. 3.

With reference to FIGS. 4, 4A and 4B encapsulation process 400 of the encapsulator 352 starts 405 with receiving 410 an IPv4 data packet, and obtaining 420 the first 48-bits of the IPv6 address of the IPv6 communication backbone 210. A determination 422 is then made, from the source and destination addresses of the IPv4 data packet, as to whether the IPv4 data packet is a transmission from the multi-protocol subnet 215 or 220 to the gateway multi-protocol subnet 225.

When it is, then a first 64-bit portion of a IPv6 destination address of a resultant IPv6 data packet is constructed 425 with the first 48-bits, that was previously obtained forming the prefix; and then appending a predetermined 16-bit subnet ID (ffff) to the prefix. The first 64-bit portion of the IPv6 destination address addresses the IPv4 portion 105 of the Internet 107. Next, the second 64-bit portion of the IPv6 destination address is constructed 430 by translating the 32-bit IPv4 destination address to a 32-bit hexadecimal, and then prefixing 32 zeros.

The first and second 64-bit portions are then combined 435 to produce the 128-bit resultant IPv6 destination address. Subsequently, the resultant IPv6 data packet is constructed 440 with the constructed IPv6 destination address and the complete IPv4 data packet as the payload. Finally, the resultant IPv6 data packet is provided 445 to the IPv6 output handler 338.

Returning to 422, when the IPv4 data packet is not a transmission from the multi-protocol subnet 215 or 220 to the gateway multi-protocol subnet 225, then the IPv4 data packet is a transmission to an IPv4 destination host on another subnet of the IPv6 communication backbone 210. Subsequently, the first 64-bit portion of an IPv6 address of the resultant IPv6 data packet is constructed 427 with the first 48-bits, that was previously obtained forming the prefix, and then appending the 16-bit subnet ID of the IPv4 destination host.

Next, the second 64-bit portion of the IPv6 destination address is constructed 428 by translating the host ID part of the 32-bit IPv4 destination address to hexadecimal. Zeros are then prefixed or pasted in the front of the host ID to construct the 64-bit interface ID part of the IPv6 destination address. The operation 400 then proceeds with combining the first and second portions 435, and continues as described earlier.

Hence, when the resultant IPv6 data packet is for communication via the IPv4 portion 105 of the Internet 107, the IPv6 destination address is derived from the destination address of the IPv4 packet, and when the resultant IPv6 data packet is for communication to a IPv4 host on another subnet, the IPv6 destination address is also derived from the destination address of the IPv4 packet. However, when the resultant IPv6 data packet is for communication via the IPv4 portion 105 of the Internet 107 the predetermined subnet ID is employed in the IPv6 destination address, and when the resultant IPv6 data packet is for communication to another destination subnet, the destination subnet ID is used in the IPv6 destination address. The IPv6 destination address when communicating to another subnet can be referred to as the virtual IPv6 address of the destination IPv4 host on that subnet.

Figure 5:
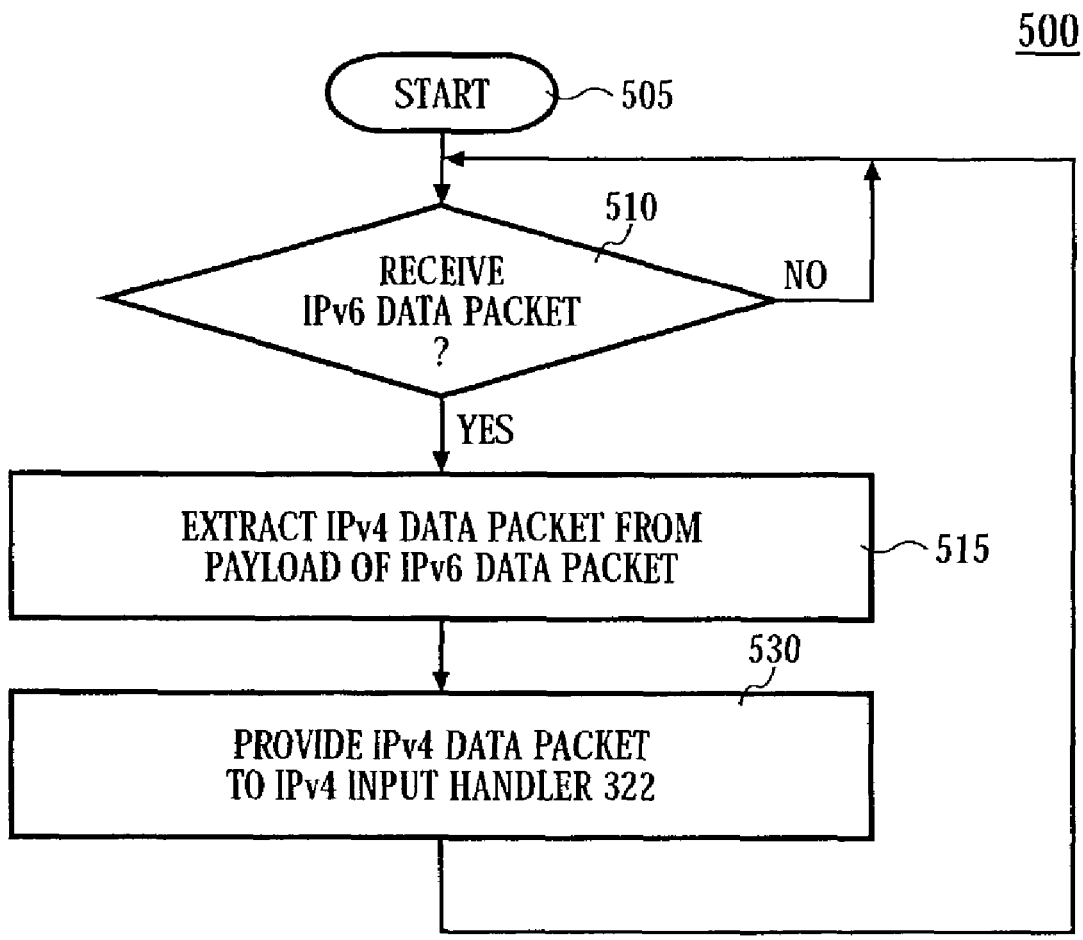
FIG. 5 shows a flowchart detailing the operation of the decapsulator in the communication protocol interface in FIG. 3.

With reference to FIG. 5 decapsulation process 500 of the decapsulator 354 starts 505 with receiving 510 an IPv6 data packet i.e. a resultant IPv6 data packet, and extracting 515 an IPv4 data packet from the payload of the resultant IPv6 data packet. Extracting is accomplished by stripping the IPv6 header from the IPv6 data packet. Next, the IPv4 data packet is provided 530 to the IPv4 input handler 322. The operation 500 then proceeds to awaiting receipt 510 of another IPv6 data packet.

Figure 6:
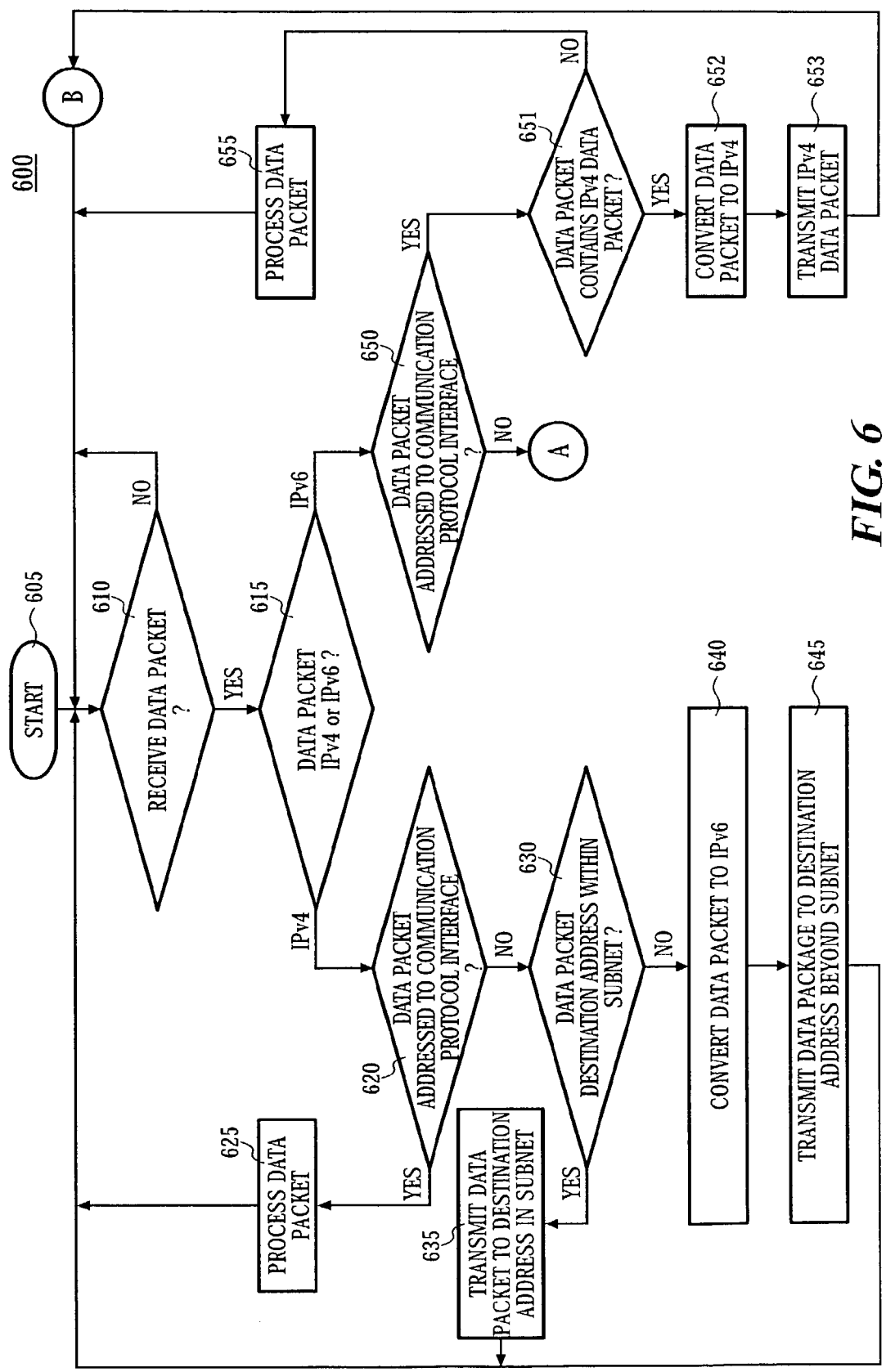
FIG. 6 shows a flowchart detailing the operation of the communication protocol interface in FIG. 3.
Figure 6:
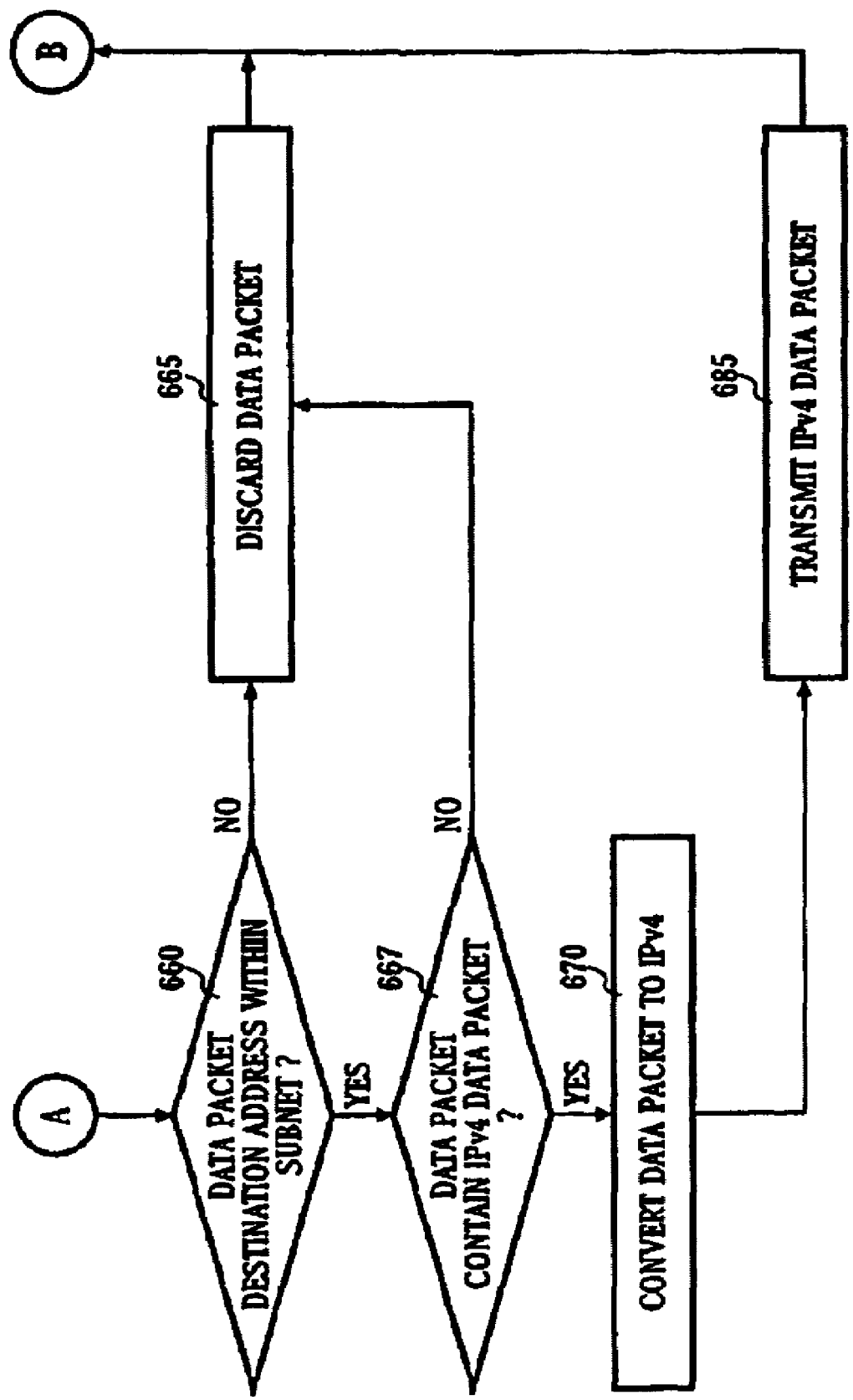

With reference to FIG. 6 operation 600 of the CPI 215E starts 605 with determining 610 whether a data packet has been received, and when a data packet is received, determining 615 whether the received data packet is an IPv4 data packet or an IPv6 data packet. When the received data packet is an IPv4 data packet, a further determination 620 is made as to whether the IPv4 data packet is addressed to the CPI 215E.

When it is, then the IPv4 data packet is processed 625 by the TCPv4 handler 325, as described earlier, and when it is not, the destination address of the IPv4 data packet is compared with the IPv4 addresses on the multi-protocol subnet 215 by accessing the IPv4 routing table 324. This determines 630 whether the IPv4 destination host of the received IPv4 data packet is on the multi-protocol subnet 215.

When the IPv4 destination host of the received IPv4 data packet is on the multi-protocol subnet 215, as determined from the IPv4 routing table 324, the IPv4 data packet is transmitted 635 by the IPv4 forwarder 326 to the addressed IPv4 destination host. However, when the addressed IPv4 destination host of the received IPv4 data packet is not on the multi-protocol subnet 215, the IPv4 data packet is sent to the encapsulator 352 where the IPv4 data packet is converted 640 to a resultant IPv6 data packet. The resultant IPv6 data packet is then transmitted 645 by the IPv6 output handler 338 to a host beyond the multi-protocol subnet 215, and the operation 600 returns to awaiting receipt 610 of another data packet.

Returning to step 615, when the received data packet is an IPv6 data packet, a further determination 650 is made as to whether the IPv6 data packet is addressed to the CPI 215E. When it is, another determination 651 is made as to whether the IPv6 data packet contains an IPv4 data packet in its payload. When the IPv6 data packet does not contain an IPv4 data packet in its payload, then the IPv6 data packet is processed 655 by the TCPv6 handler 335, as described earlier. Alternatively, whether the IPv6 data packet contains an IPv4 data packet, the IPv6 data packet is converted 652 to an IPv4 data packet by extracting the IPv4 data packet from the payload of the IPv6 data packet. The resultant IPv4 data packet is then transmitted 653 by the IPv4 output handler 328 to the destination host indicated by the destination address of the IPv4 data packet, as described earlier. The operation 600 then returns to step 610 of awaiting receipt of the next data packet.

Returning to step 650, when the received IPv6 data packet is not addressed to the CPI 215E, a further determination 660 is made as to whether the destination address of the IPv6 data packet is within the multi-protocol subnet 215. When it is not, the IPv6 data packet is discarded 665, and the operation 600 returns to awaiting receipt 610 of a next data packet. However, when the destination address of the IPv6 data packet is within the multi-protocol subnet 215, another determination 667 is made as to whether the IPv6 data packet contains an IPv4 data packet in its payload. When the IPv6 data packet does not contain an IPv4 data packet, the IPv6 data packet is discarded 665, and the operation proceeds as described above. Alternatively, when the IPv6 data packet contains an IPv4 data packet, the IPv6 data packet is converted 670 to a resultant IPv4 data packet by extracting the IPv4 data packet from the payload of the IPv6 data packet, and transmitting 685 the IPv4 data packet by the IPv4 output handler 328 to the destination host indicated by the destination address of the IPv4 data packet, as described earlier. The operation 600 then returns to step 610 of awaiting receipt of the next data packet.

Figure 7:
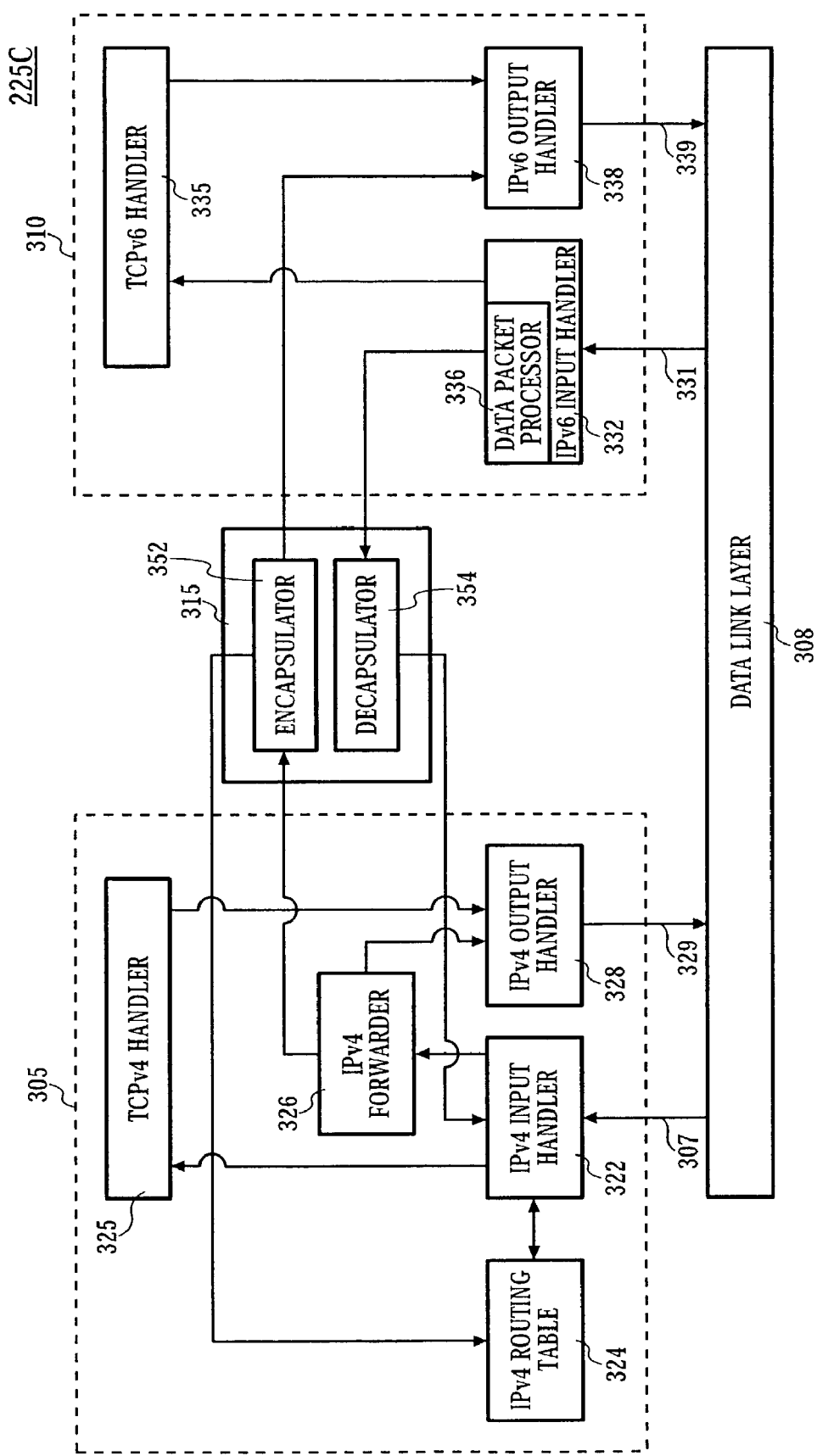
FIG. 7 shows a functional block diagram of a gateway communication protocol interface in the communication system in FIG. 2, in accordance with the present invention.

With reference to FIG. 7 it will be observed that the GCPI 225C in the multi-protocol subnet 225 is identical to the CPI 215E employed in the multi-protocol subnet 215, except for the absence of the IPv6 address proxy 340. The operation of the GCPI 225C is also similar to that of the CPI 215E, as described.

The CPI 215E and the GCPI 225C support dynamic encapsulation of IPv4 data packets in resultant IPv6 data packets, and decapsulation of IPv4 data packets from the resultant IPv6 data packets. Dynamic encapsulation supports dynamic tunneling of IPv4 data packets across IPv6 networks, where the IPv6 protocol layer can be viewed as a link layer of the IPv4 protocol. Dynamic tunneling, as disclosed herein, does not require an end-to-end link to be established between two tunnel end points on a network. Consequently, dynamic tunneling does not require a known tunnel end point address prior to setting up a tunnel. Instead, the resultant IPv6 or outer encapsulation layer destination address is advantageously derived and constructed from the destination address of the encapsulated IPv4 data packet, dynamically, and the resultant IPv6 data packet is routed through IPv6 infrastructure to its destination host.

Tunneling is used for communicating data packets between the CPIs in subnets, including multi-protocol subnets 215 and 220, and between CPIs in subnets, including the multi-protocol subnets 215 and 220, and GCPIs, including the GCPI 225. In addition, no stateful information of the dynamic encapsulation process is maintained on the GCPI 225C. Therefore, more than one GCPI can be deployed on a boundary between the IPv4 network and the IPv6 network for encapsulation and decapsulation to cater for data traffic conditions. Thus, the present invention, as described, advantageously provides scalability and flexibility.

The CPI 215E and the GCPI 225C can both be implemented on a Linux kernel version 2.4.7. It is envisaged that both the CPI 215E and the GCPI 225C can be implemented as software modules within a destination host, a stand-alone unit coupled to a subnet and an IPv6 network, be incorporated in a data-switching unit, or be incorporated in a network interface card (NIC). The GCPI 225 can also be implemented as a software module in a border router.

Figure 8:
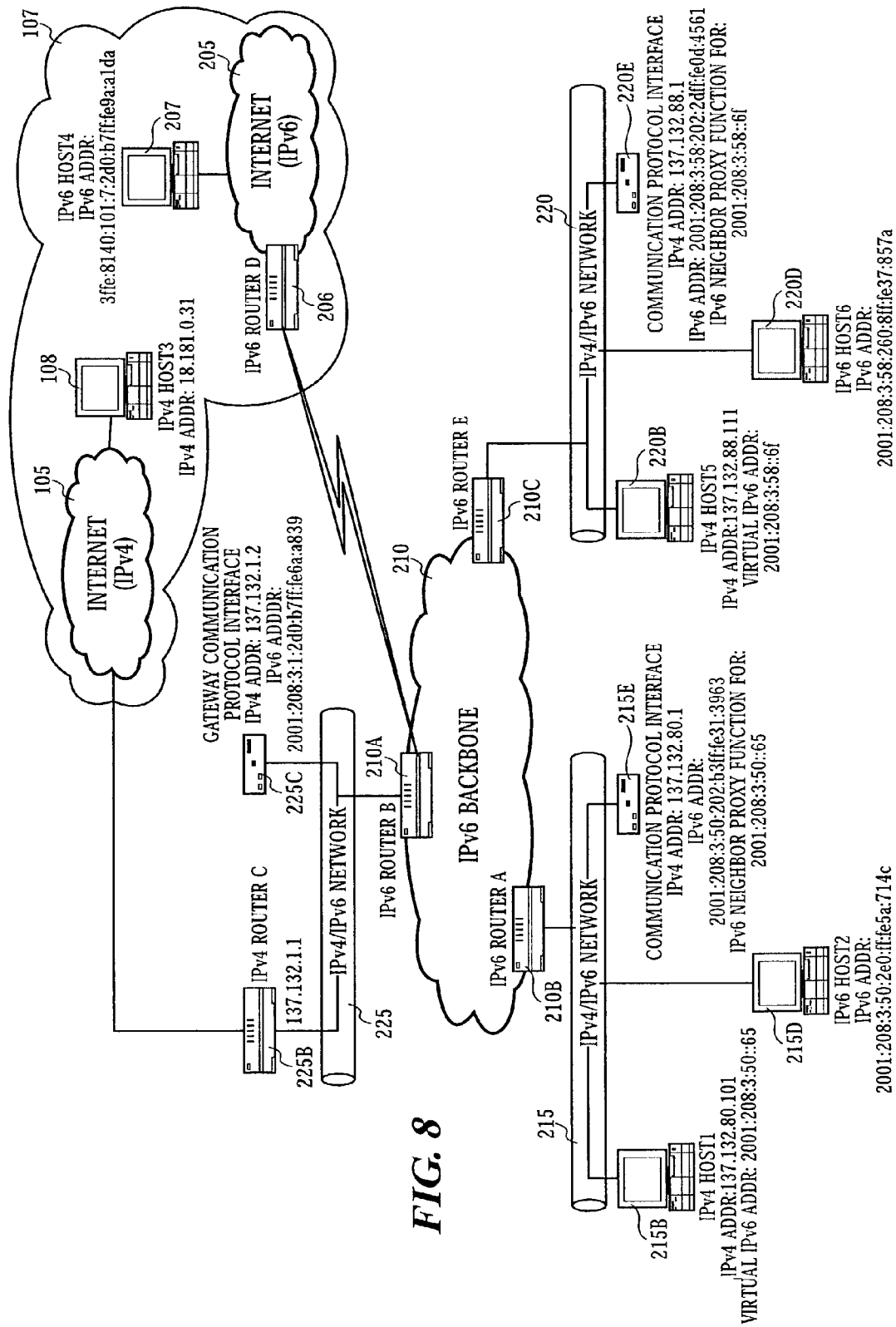
FIG. 8 shows the communication network in FIG. 2 with addressing information added.
Figure 9:
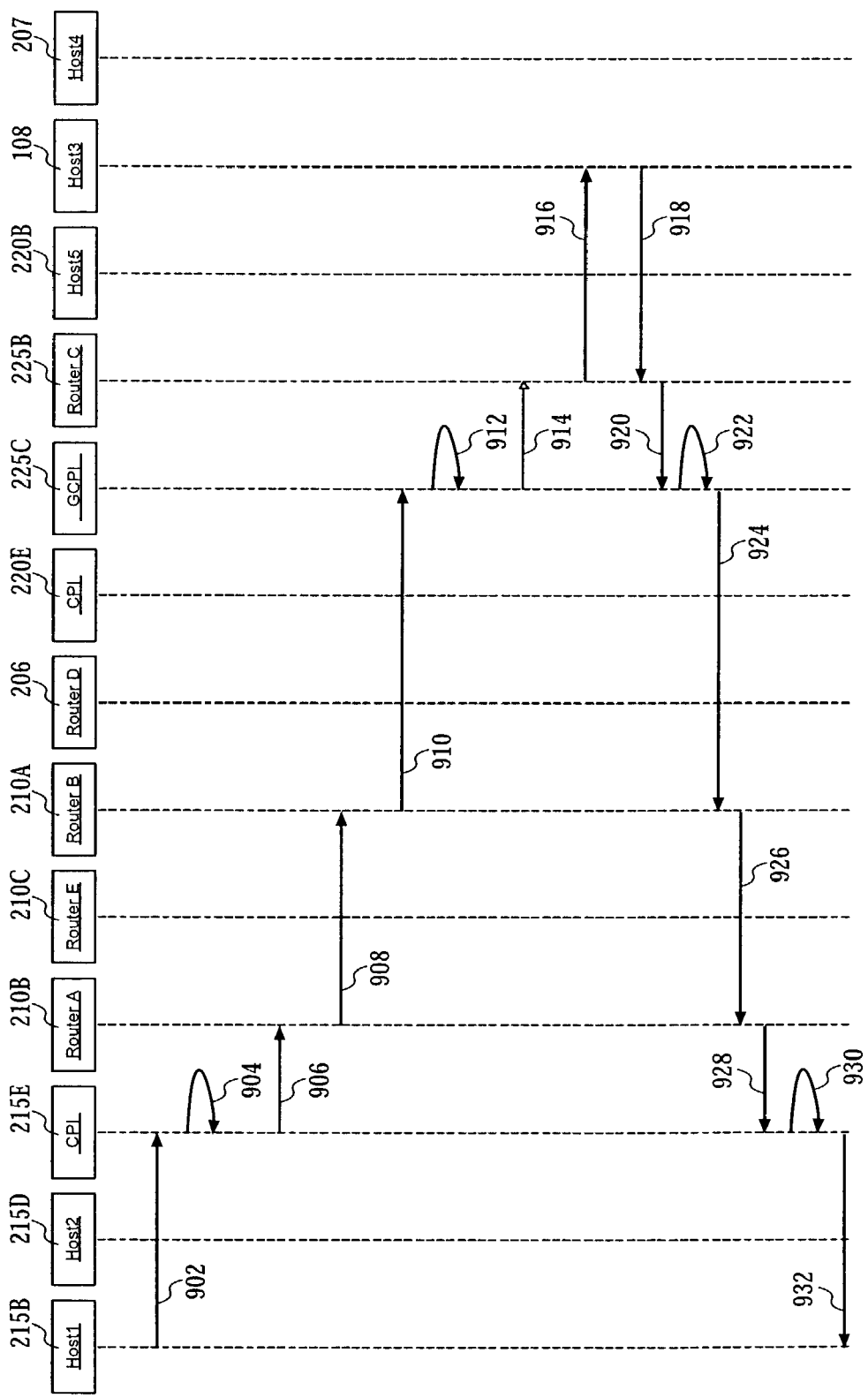
FIG. 9 shows a sequence diagram for communication on the communication network in FIG. 2 from a subnet to a portion of the Internet that operates on IPv4.

With reference to FIG. 8 and FIG. 9 the sequence of actions that occur when the IPv4 host1-215B in the multi-protocol subnet 215 communicates with the IPv4 host3-108 on the IPv4 portion 105 of the Internet 107, now follows.

902—The IPv4 host1-215B having IPv4 address 137.132.80.101 wants to send one IPv4 data packet to the IPv4 host3-108 having IPv4 address 18.181.0.31. In accordance with the routing table 324 on IPv4 host1-215B, the IPv4 data packet is sent to the default gateway, which in this instance is the CPI 215E having IPv4 address 137.132.80.1

904—When the CPI 215E receives the IPv4 data packet, the CPI 215E checks its IPv4 routing table 324, and forwards the IPv4 data packet in accordance with the entries therein. Consequently, the IPv4 data is sent to the encapsulator 352. The encapsulator 352 encapsulates the IPv4 data packet and produces a resultant IPv6 data packet, having an IPv6 source address of the CPI 215E i.e., 2001:208:3:50: 202:b3ff:fe31:3963, and having an IPv6 destination address 2001:208:3:ffff12b5:1f, which is derived from the destination address 18.181.0.31 of the IPv4 data packet.

906—The resultant IPv6 data packet is then routed to IPv6 router A-210B1;

908—forwarded from router A-210B1 to IPv6 router B-210A; and

910—forwarded from router B-210A to the GCPI 225C.

912—At the GCPI 225C, when the resultant IPv6 data packet is received, it is sent to its decapsulator 354, which decapsulates the IPv6 header to produce the original IPv4 data packet. The IPv4 data packet is then routed according to its IPv4 routing table 324.

914—The IPv4 packet is routed to the IPv4 router C-225B; and

916—the IPv4 router C-225B forwards the IPv4 packet to the destination IPv4 host3-108, in accordance with the destination address 18.181.0.31 of the original IPv4 data packet, over the IPv4 portion 105 of the Internet 107.

918—The IPv4 host3-108 receives the IPv4 data packet and acknowledges with a return IPv4 data packet back to the IPv4 host1-215B i.e. the destination address of the return IPv4 data packet is 137.132.80.101, and the source address is 18.181.0.31.

920—When the returning IPv4 data packet reaches the IPv4 router C-225B, it is routed the GCPI 225C.

922—When the GCPI 225C receives the returning IPv4 data packet, it is sent to its encapsulator 352, in accordance with its IPv4 routing table 324. The routing table 324, stores the IPv4 addresses of the IPv4 hosts and dual-stack hosts on the various multi-protocol subnets 215 and 220 of the communication network 200. Thus, the routing table 324 is used to determine whether the destination address of the returning IPv4 data packet is within the communication network 200. The encapsulator 352 then encapsulates the returning IPv4 data packet to produce a returning resultant IPv6 data packet. The header of the returning IPv6 data packet has source address 2001:208:3:1:2d0:b7ff:fe6a:a839, which is the IPv6 address of the GCPI 225C. The destination address of the returning IPv6 data packet is the virtual IPv6 address of the destination IPv4 host1-215B i.e. 2001:208: 3:50::65, which was assigned in accordance with the address assignment scheme described earlier.

924—The returning IPv6 data packet is then sent to the router B-210A on the IPv6 communication backbone 210.

926—Router B-210A forwards the returning IPv6 data packet router A-210B; and

928—router A-210B then forwards the returning IPv6 data packet to the CPI 215E.

930—At the CPI 215E, the returning IPv6 data packet is routed to the decapsulator 354, which decapsulates the returning IPv6 data packet and produces the returning IPv4 data packet.

932—The CPI 215E then sends the returning IPv4 data packet to the IPv4 host1-215B, which finally receives the returning IPv4 data packet.

Figure 10:
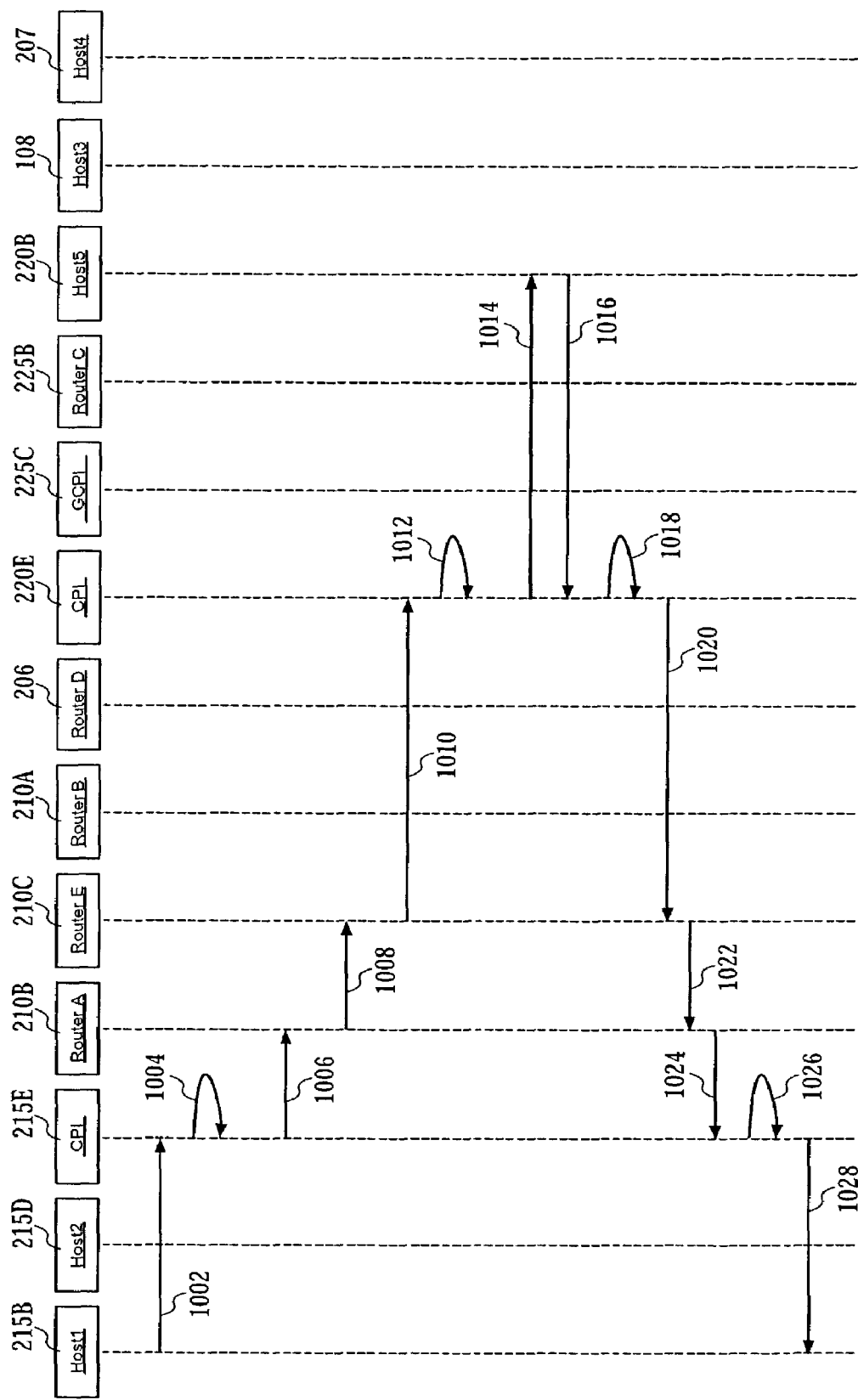
FIG. 10 shows a sequence diagram for communication on the communication network in FIG. 2 between subnets.

With reference to FIG. 8 and FIG. 10 the sequence of actions that occur when the IPv4 host1-215B in the multi-protocol subnet 215 communicates with the IPv4 host5-220B in the multi-protocol subnet 220, now follows.

1002—The IPv4 host1-215B having IPv4 address 137.132.80.101 wants to send one IPv4 data packet to the IPv4 host5-220B having IPv4 address 137.132.88.111. In accordance with the routing table 324 at the IPv4 host1-215B, the IPv4 data packet is sent to a default gateway, which in this instance is the CPI 215E having IPv4 address 137.132.80.1

1004—When the CPI 215E receives the IPv4 data packet, the CPI 215E checks its IPv4 routing table 324, and forwards the IPv4 data packet in accordance with the entries therein. Consequently, the IPv4 data is sent to the encapsulator 352. The encapsulator 352 encapsulates the IPv4 data packet and produces a resultant IPv6 data packet, having an IPv6 source address of the CPI 215E i.e., 2001:208:3:50: 202:b3ff:fe31:3963, and having an IPv6 destination address 2001:208:3:58::6f, which is the IPv6 virtual address of the IPv4 host5-220B.

1006—The resultant IPv6 data packet is then routed to router A-210B;

1008—from router A-210B to router E-210 C; and

1010—from router E-210C to the CPI 220E.

1012—At the CPI 220E, when the resultant IPv6 data packet is received, it is sent to its decapsulator 354 which decapsulates the IPv6 header to produce the original IPv4 data packet. The IPv4 data packet is then routed according to its IPv4 routing table 324.

1014—The IPv4 data packet is then routed to the destination IPv4 host5-220B.

1016—The IPv4 host5-220B receives the IPv4 data packet and acknowledges with a return IPv4 data packet back to the IPv4 host1-215B i.e. the destination address of the return IPv4 data packet is 137.132.80.101, and the source address is 137.132.88.111. In accordance with its routing table 324 the return IPv4 data packet is sent to its encapsulator 352.

1018—The encapsulator 352 encapsulates the returning IPv4 data packet to produce a returning resultant IPv6 data packet. The header of the returning IPv6 data packet has source address 2001:208:3:58:202:2dff:fe0D:4561, which is the IPv6 address of the CPI 220E. The destination address of the returning IPv6 data packet is the virtual IPv6 address of the destination IPv4 host1-215B i.e. 2001:208:3:50::65, which was assigned in accordance with the address assignment scheme described earlier.

1020—The CPI 220E then sends the returning IPv6 data packet to the router E-210C.

1022—Router E-210C forwards the returning IPv6 data packet to router A-210B; and 1024—router A-210B forwards the returning IPv6 data packet to the CPI 215E.

1026—At the CPI 215E, the returning IPv6 data packet is routed to the decapsulator 354, which decapsulates the IPv6 data packet and produces the returning IPv4 data packet.

1028—The CPI 215E then sends out the returning IPv4 packet to the IPv4 host1-215B, which finally receives the returning IPv4 data packet.

Figure 11:
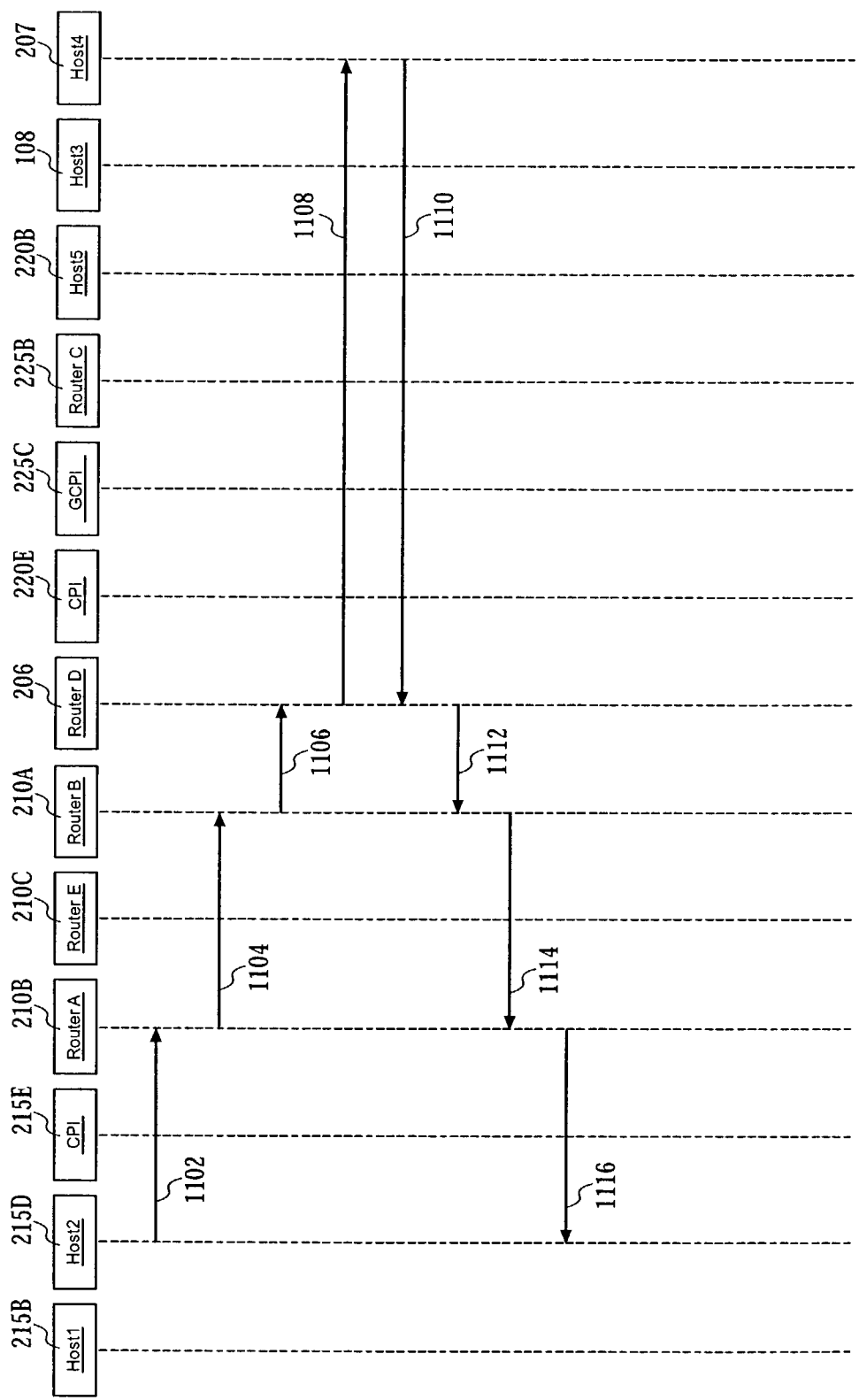
FIG. 11 shows a sequence diagram for communication on the communication network in FIG. 2 from a subnet to a portion of the Internet that operates on IPv6.

With reference to FIG. 8 and FIG. 11 the sequence of actions that occur when the IPv6 host2-215D in the multi-protocol subnet 215 communicates with the IPv6 host4-207 in the IPv6 portion 205 of the Internet 107, now follows.

1102—The IPv6 host2-215D having IPv6 address 2001:208:3:50:2e0:ff:fe5a:714c wants to send an IPv6 data packet to the IPv6 host4-207 having address 3ffe:8140:101:7:2d0:b7ff:fea9:a1da. Hence, the IPv6 data packet has source address 2001:208:3:50:2e0:ff:fe5a:714c, and destination address 3ffe:8140:101:7:2d0:b7ff:fea9:a1da. In accordance with the IPv6 routing table at the IPv6 host2-215D, the IPv6 data packet is sent to a default gateway, which in this instance is router A-210B.

1104—The IPv6 data packet is then forwarded by router A-210B to router B-210A;

1106—and then forwarded by router B-210A to router D-206, which on the IPv6 portion 205 of the Internet 107.

1108—The IPv6 data packet is then routed through the IPv6 portion 205 of the Internet 107 to the destination IPv6 host4-207. The IPv6 host4-207 then acknowledges with a return IPv6 data packet back to the IPv6 host2-215D i.e. the destination address of the return IPv6 data packet is 2001:208:3:50:2e0:ff:fe5a:714c, and the source address is 3ffe:8140:101:7:2d0:b7ff:fea9:a1da.

1110—The returning IPv6 data packet is then routed to the default gateway router D-206, in accordance with the routing table at the IPv6 host4-207.

1112—Router D-206 then forwards the returning IPv6 data packet to router B-210A; and 1114—router B-210A forwards the returning IPv6 data packet to router A-210B.

1116—Router A-210B subsequently sends the returning IPv6 data packet to the IPv6 host2-215D, which finally receives the returning IPv6 data packet.

The communication protocol interface of the present invention as described, advantageously provides transparent communication between IPv4 and IPv6, and is also scalable.

This is accomplished by adopting an IPv6 communication backbone of an organizations communication network, and incorporating CPIs in subnets of the IPv6 communication backbone. With a CPI, a subnet effectively becomes a multi-protocol subnet, as IPv4, IPv6 and dual-stack hosts are supported. The CPIs in the multi-protocol subnets co-operate to advantageously provide dynamic tunneling, which transports IPv4 data packets within IPv6 data packets, between the multi-protocol subnets. In addition, when a gateway multi-protocol subnet is configured with a GCPI, which is identical to the CPIs in the other subnets, transparent communication is advantageously extended to between the subnets and the Internet.

Thus, the present invention, as described provides a method and apparatus for communicating on a communication network, which overcomes or at least reduces the abovementioned problems of the prior art.

It will be appreciated that although only particular embodiments of the invention have been described in detail, various modifications and improvements can be made by a person skilled in the art without departing from the scope of the present invention.

The invention claimed is:

1. A communication protocol interface (CPI) for communicating a variety of data packets that comply with a corresponding variety of communication protocols on a communication network, the CPI comprising:
a first communication protocol processor comprising:
a first input for receiving a data packet that complies with a first of the variety of communication protocols; a second input for receiving a resultant data packet that complies with the first of the variety of communication protocols;
a first output for providing the data packet when the data packet is addressed to a subnet associated with the CPI, and the first output for providing the resultant data packet when the resultant data packet is addressed to the subnet associated with the CPI; and
a second output for providing the data packet when the data packet is addressed beyond the subnet associated with the CPI;
a second communication protocol processor comprising:
a first input for receiving another data packet that complies with a second of the variety of communication protocols;
a second input for receiving another resultant data packet that complies with the second of the variety of communication protocols;
a first output for providing the another data packet when the another data packet is addressed to the CPI, and for providing the another resultant data packet; and
a second output for providing the another data packet when the another data packet is addressed to the subnet associated with the CPI; and
a protocol converter comprising:
a first input coupled to the second output of the first communication protocol processor for receiving the data packet, and the protocol converter for converting the data packet to the another resultant data packet;
a first output coupled to the second input of the second communication protocol processor for providing the another resultant data packet to the second communication protocol processor;
a second input coupled to the second output of the second communication protocol processor for receiving the another data packet, and the protocol converter for converting the another data packet to the resultant data packet; and
a second output coupled to the second input of the first communication protocol processor for providing the resultant data packet to the first communication protocol processor;
a communication backbone which complies with an IPv6 protocol;
wherein the protocol converter comprises an encapsulator coupled to the first input and to the first output, the encapsulator for encapsulating the data packet to produce the another resultant data packet;

wherein the encapsulator is adapted to provide the another resultant data packet having the destination address with the first part derived from the address of the CPI, a second predetermined part, and a third part derived from at least a portion of the destination address of the data packet, when the data packet is for communication beyond the communication network.

2. A CPI in accordance with claim 1 wherein the first communication protocol processor further comprises a first input handler having a first input coupled to the first input thereof to receive the data packet, and having a second input coupled to the second input thereof to receive the resultant data packet, the first input handler for determining that a received data packet is not addressed to the CPI, and the first input handler having a first output for providing the received data packet when the received data packet is not addressed to the CPI.

3. A CPI in accordance with claim 2 wherein the first communication protocol processor further comprises a first forwarder coupled to the first output of the first input handler for receiving the received data packet, and the first forwarder having a first output coupled to the second output thereof for providing the received data packet thereto when the received data packet is not addressed to the subnet associated with the CPI.

4. A CPI in accordance with claim 3 wherein the first forwarder has a second output for providing the received data packet when the received data packet is addressed to the subnet associated with the CPI, wherein the first communication protocol processor further comprises a first output handler having a first input coupled to the second output of the first forwarder for receiving the received data packet, and the first output handler being coupled to the first output thereof for providing the received data packet thereto.

5. A CPI in accordance with claim 4 wherein the first input handler has a second output for providing the received data packet when the received data packet is addressed to the CPI,
wherein the first communication protocol processor further comprises a first transmission control protocol handler coupled to the second output of the first input handler, the first transmission control protocol handler for processing the received data packet and for providing resultant output data for further processing, and the first transmission control protocol handler for processing input data and providing a resultant CPI-originated data packet, and
wherein the first output handler further comprises a second input coupled to the first transmission control protocol handler for receiving the resultant CPI-originated data packet therefrom, and for providing the resultant CPI-originated data packet to the first output thereof.

6. A CPI in accordance with claim 2 wherein the first communication protocol processor further comprises a routing memory coupled to the first input handler, the routing memory for storing predetermined routing addresses associated with the CPI in the communication network, wherein the first input handler accesses the routing memory to determine that the received data packet is addressed to the CPI.

7. A CPI in accordance with claim 1 wherein the second communication protocol processor comprises a second input handler coupled to the first input thereof for receiving the another data packet, and the second input handler having a first output coupled to the second output thereof for providing the another data packet when the another data packet is not addressed to the CPI.

8. A CPI in accordance with claim 7 wherein the second input handler comprises a data packet processor for determining the another data packet contains the resultant data packet.

9. A CPI in accordance with claim 8 wherein the second communication protocol processor further comprises an address memory for storing addresses associated with the CPI on the communication network, wherein the data packet processor accesses the address memory to determine that the another data packet is addressed to the subnet associated with the CPI.

10. A CPI in accordance with claim 9 wherein the second communication protocol processor further comprises a second output handler having a first input coupled to the second input thereof for receiving the another resultant data packet, and coupled to the second output thereof for providing the another resultant data packet thereto.

11. A CPI in accordance with claim 10 wherein the second input handler has a second output for providing the another data packet when the another data packet is addressed to the CPI,
wherein the second communication protocol processor further comprises a second transmission control protocol handler coupled to the second output of the second input handler, the second transmission control protocol handler for processing the another data packet and for providing resultant output data for further processing, and the second transmission control protocol handler for processing input data and providing a resultant CPI-originated data packet, and
wherein the second output handler further comprises a second input coupled to the second transmission control protocol handler for receiving the resultant CPI-originated data packet therefrom, and. for providing the resultant CPI-originated data packet to the first output thereof.

12. A CPI in accordance with claim 1 wherein the encapsulator is coupled to a routing memory, wherein the routing memory includes at least destination addresses on the communication network, the encapsulator for providing the another resultant data packet having a destination address with a first part derived from the address of the CPI, a second part determined relative to the destination addresses in the routing memory, and a third part derived from the destination address of the data packet, when the data packet is for communication within the communication network.

13. A CPI in accordance with claim 1 wherein the protocol converter comprises a decapsulator coupled to the second input and to the second output, the decapsulator for decapsulating the another data packet to produce the resultant data packet.

14. A CPI in accordance with claim 13 wherein the decapsulator is adapted for providing the resultant data packet for transmission to the destination address thereof.

15. A CPI in accordance with claim 1 wherein the first communication protocol processor comprises an Internet Protocol (IP) stack.

16. A CPI in accordance with claim 15 wherein the IP stack comprises an IP version 4 protocol (IPv4) stack.

17. A CPI in accordance with claim 1 wherein the second communication protocol processor comprises an Internet Protocol (IP) stack.

18. A CPI in accordance with claim 17 wherein the IP stack comprises an IP version 6 protocol (IPv6) stack.

19. A CPI in accordance with claim 1 wherein the protocol converter comprises an IPv4 to IPv6 converter.

20. A CPI in accordance with claim 1 wherein the protocol converter comprises an IPv6 to IPv4 converter.

21. A CPI in accordance with claim 1 wherein the first input and the first output of the first communication protocol processor and the first input and the first output of the second communication protocol processor are suitably adapted for coupling to a data link of the communication network.

22. A CPI in accordance with claim 1 wherein the communication network comprises a plurality of communication subnets for coupling to a communication backbone, and wherein the CPI is operable in at least two of the plurality of communication subnets.

23. A CPI in accordance with claim 22 wherein the communication backbone is adapted to communicate data packets that comply with one of the variety of communication protocols.

24. A CPI in accordance with claim 22 wherein at least one of the plurality of communication subnets is adapted to communicate corresponding data packets that comply with at least the first and the second of the variety of communication protocols.

25. A CPI in accordance with claim 24 wherein the communication subnet comprises at least one IPv4 host.

26. A CPI in accordance with claim 24 wherein the communication subnet comprises at least one IPv6 host.

27. A GPI in accordance with claim 24 wherein the communication subnet comprises at least one dual-stack (IPv4 and IPv6) host.

28. A CPI in accordance with claim 1 wherein the communication network comprises a gateway communication subnet for coupling to a communication backbone and to the Internet.

29. A CPI in accordance with claim 28 wherein the gateway communication subnet comprises at least one router for routing data packets to and from the Internet.

30. A CPI in accordance with claim 28 wherein the at least one router comprises an IPv4 router.

31. A method in a communication protocol interface (CPI) for communicating a variety of data packets that comply with a corresponding variety of communication protocols on a communication network, the method comprising:
   a) receiving a data packet;
   b) determining the communication protocol of the data packet is the first of the variety of communication protocols;
   c) determining destination address of the data packet;
   d) transmitting the data packet in accordance with the destination address thereof on the communication network when the destination address is associated with one of a plurality of predetermined destination addresses on the communication network; and
   e) when the destination address is not associated with any of the plurality of predetermined destination addresses on the communication network, converting the data packet to a second of the variety of communication protocols to produce another resultant data packet, wherein the destination address of the another resultant data packet comprises a first part derived from an address of the CPI, a second part determined relative to the destination addresses on the communication network, and a third part derived from the destination address of the data packet;

wherein said communication network comprising a communication backbone which complies with an IPv6 protocol.

32. A method in accordance with claim 31 further comprising after (c)
   determining the destination address of the data packet is the address of the CPI; and
   processing the data packet at the CPI.

33. A method in accordance with claim 31 wherein (b) comprises determining the communication protocol of the data packet is an Internet Protocol.

34. A method in accordance with claim 33 wherein (b) comprises determining the communication protocol of the data packet is Internet Protocol version 4 (IPv4).

35. A method in accordance with claim 34 wherein (c) comprises determining the data packet has a 32-bit destination address when the data packet is an IPv4 data packet.

36. A method in accordance with claim 33 wherein (b) comprises determining the communication protocol of the data packet is Internet Protocol version 6 (IPv6).

37. A method in accordance with claim 34 wherein (c) comprises determining the data packet has a 128-bit destination address when the data packet is an IPv6 data packet.

38. A method in accordance with claim 31 wherein (e) comprises converting the data packet to a second of the variety of communication protocols to produce another resultant data packet, wherein the destination address of the another resultant data packet comprises a first part derived from an address of the CPI, a second part being predetermined data, and a third part derived from the destination address of the data packet.

39. A method in accordance with claim 31 wherein (e) comprises determining the second part of the another resultant data packet represents a network ID of the communication network.

40. A communication network comprising:
   an infrastructure portion for communicating data packets that comply with a first communication protocol thereon;
   a first multi-protocol subnet coupled to the infrastructure portion comprising:
      at least a first host operating on a second communication protocol, the at least the first host for transmitting a data packet that complies with the second communication protocol to a destination host on a second multi-protocol subnet; and
      a first communication protocol interface (CPI) coupled to the at least the first host, the first CPI for receiving the data packet, converting the data packet to another resultant data packet that complies with the first communication protocol, and for transmitting the resultant data packet via the infrastructure portion to the second multi-protocol subnet;
   the second multi-protocol subnet comprising:
      a second CPI for receiving the resultant data packet, for converting the resultant data packet back to the data packet that complies with the second communication protocol, and for transmitting the data packet to the destination host; and
      the destination host coupled to the second CPI operating on the second communication protocol for receiving and processing the data packet; and
   a communication backbone which complies with an IPv6 protocol;
   wherein the first CPI comprises an encapsulator for converting the data packet to the resultant data packet that complies with the first communication protocol, wherein the encapsulator is adapted to provide the another resultant data packet having the destination address with the first part derived from the address of the CPI. a second predetermined part, and a third nart derived from at least a portion of the destination address of the data packet, when the data packet is for communication beyond the communication network.

41. A communication network in accordance with claim 40 wherein the second CPI comprises a decapsulator for converting the resultant data packet back to the data packet that complies with the second communication protocol.

* * * * *

UNITED STATES PATENT AND TRADEMARK OFFICE
CERTIFICATE OF CORRECTION

PATENT NO.        : 7,231,452 B2                                         Page 1 of 1
APPLICATION NO.  : 10/306985
DATED             : June 12, 2007
INVENTOR(S)       : Akkihebbal Lakshminarayana Ananda It is certified that error appears in the above-identified patent and that said Letters Patent is hereby corrected as shown below:

Column 20, line 38, after "and." delete the "." (period)

Column 21, line 31, delete "GPI" and substitute therefor -- CPI --

Column 23, line 4, delete "CPI." (the period) and substitute therefor -- CPI, -- (the comma)

Column 23, line 4, delete "nart" and substitute therefor -- part --

Signed and Sealed this

First Day of July, 2008

JON W. DUDAS
*Director of the United States Patent and Trademark Office*